United States Patent
Aabye et al.

(10) Patent No.: US 10,115,099 B2
(45) Date of Patent: Oct. 30, 2018

(54) OVER THE AIR MANAGEMENT OF PAYMENT APPLICATION INSTALLED IN MOBILE DEVICE

(71) Applicant: Visa International Service Association, San Francisco, CA (US)

(72) Inventors: Christian Aabye, Foster City, CA (US); Olivier Brand, Walnut Creek, CA (US); Michael Lindelsee, Redwood City, CA (US); Joseph J. Mirizzi, Copperopolis, CA (US); Hao Ngo, San Jose, CA (US); Lauren White, San Bruno, CA (US); David William Wilson, Camberley (GB)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 15/010,641

(22) Filed: Jan. 29, 2016

(65) Prior Publication Data
US 2016/0224971 A1 Aug. 4, 2016

Related U.S. Application Data

(62) Division of application No. 12/563,540, filed on Sep. 21, 2009, now Pat. No. 9,286,604.
(Continued)

(51) Int. Cl.
*G06Q 40/00* (2012.01)
*G06Q 20/32* (2012.01)
(Continued)

(52) U.S. Cl.
CPC ......... *G06Q 20/3227* (2013.01); *G06Q 20/32* (2013.01); *G06Q 20/325* (2013.01);
(Continued)

(58) Field of Classification Search
CPC ................................ G06F 21/31; G06Q 40/00
See application file for complete search history.

(56) References Cited

U.S. PATENT DOCUMENTS 5,991,882 A 11/1999 O'Connell
6,169,890 B1 1/2001 Vatanen
(Continued)

FOREIGN PATENT DOCUMENTS

EP 1804210 A1 7/2007
EP 1855414 A1 11/2007
(Continued)

OTHER PUBLICATIONS

Krista Becker, Mobile Phone: The New Way to Pay?, Feb. 2007, Federal Reserve Bank of Boston, web, 1-11 (Year: 2007).*
(Continued)

*Primary Examiner* — I Jung Liu
(74) *Attorney, Agent, or Firm* — Kilpatrick Townsend & Stockton LLP

(57) ABSTRACT

Systems, apparatus, and methods for managing an application installed on a mobile device, such as a mobile phone are provided, so as to prevent or limit unauthorized use of the application, for example, when the mobile device is lost, stolen, or otherwise subject to unauthorized use. A request to enable or disable user access to a function of the application can be received by a server computer. A command message responsive to the request can be generated by the server computer, the command message comprising control data for enabling or disabling user access to the function of the application. The generated command message can be transmitted to the mobile device over a wireless network.

13 Claims, 13 Drawing Sheets

Related U.S. Application Data

(60) Provisional application No. 61/220,550, filed on Jun. 25, 2009, provisional application No. 61/220,540, filed on Jun. 25, 2009, provisional application No. 61/099,060, filed on Sep. 22, 2008.

(51) Int. Cl.
  *G06Q 20/40* (2012.01)
  *H04L 29/06* (2006.01)

(52) U.S. Cl.
  CPC .......... *G06Q 20/40* (2013.01); *G06Q 20/401* (2013.01); *G06Q 20/4014* (2013.01); *G06Q 40/00* (2013.01); *H04L 63/102* (2013.01)

(56) References Cited

U.S. PATENT DOCUMENTS

| | | | |
|---|---|---|---|
| 6,192,474 | B1 | 2/2001 | Patel et al. |
| 6,720,860 | B1 | 4/2004 | Narayanaswani |
| 6,934,689 | B1 | 8/2005 | Ritter |
| 7,117,494 | B2 | 10/2006 | Rajaram |
| 7,152,782 | B2 | 12/2006 | Shenker et al. |
| 7,464,865 | B2 | 12/2008 | Brown et al. |
| 7,469,151 | B2 | 12/2008 | Khan et al. |
| 7,774,231 | B2 | 8/2010 | Pond et al. |
| 8,523,069 | B2 | 9/2013 | Hammad et al. |
| 8,688,580 | B1 | 4/2014 | Guenther et al. |
| 2003/0088633 | A1 | 5/2003 | Chiu et al. |
| 2003/0097596 | A1* | 5/2003 | Muratov .................. G06F 21/31 726/26 |
| 2003/0110479 | A1 | 6/2003 | Rajaram |
| 2004/0030601 | A1 | 2/2004 | Pond et al. |
| 2004/0097217 | A1 | 5/2004 | McClain |
| 2005/0044404 | A1* | 2/2005 | Bhansali ............... G06F 21/572 726/26 |
| 2005/0138390 | A1 | 6/2005 | Adams et al. |
| 2005/0160297 | A1 | 7/2005 | Ogawa |
| 2005/0246343 | A1 | 11/2005 | Burns et al. |
| 2006/0026689 | A1 | 2/2006 | Barker et al. |
| 2006/0080232 | A1 | 4/2006 | Epps |
| 2007/0016804 | A1 | 1/2007 | Kemshall |
| 2007/0101411 | A1 | 5/2007 | Babi et al. |
| 2007/0266258 | A1 | 11/2007 | Brown et al. |
| 2008/0058014 | A1 | 3/2008 | Khan et al. |
| 2008/0064383 | A1 | 3/2008 | Nath et al. |
| 2008/0120703 | A1 | 5/2008 | Morris et al. |
| 2008/0137593 | A1 | 6/2008 | Laudermilch et al. |
| 2008/0178300 | A1 | 7/2008 | Brown et al. |
| 2008/0207124 | A1 | 8/2008 | Raisanen et al. |
| 2008/0208762 | A1 | 8/2008 | Arthur et al. |
| 2008/0222706 | A1 | 9/2008 | Renaud et al. |
| 2008/0238610 | A1 | 10/2008 | Rosenberg et al. |
| 2008/0270301 | A1* | 10/2008 | Jones ..................... G06Q 40/00 705/41 |
| 2009/0108063 | A1 | 4/2009 | Jain et al. |
| 2009/0253406 | A1* | 10/2009 | Fitzgerald ............... G06F 21/88 455/410 |
| 2012/0150601 | A1* | 6/2012 | Fisher .................... G06Q 20/20 705/14.23 |

FOREIGN PATENT DOCUMENTS

| | | |
|---|---|---|
| KR | 10-2003-0047962 A | 6/2003 |
| RU | 76485 U1 | 9/2008 |
| WO | 2008/134277 A1 | 11/2008 |

OTHER PUBLICATIONS

Toorhani et al. "SSMS—A Secure SMS Messaging Protocol for the M-Payment Systems," published in IEEE, Symposium on Computers and Communications, ISCC 2008, Date of Conference Jul. 6-9, 2008, Date added to IEEE Xplore: Sep. 16, 2008.

Examiner's Report dated Mar. 3, 2017 in Australian Patent Application No. 2015215930, 5 pages.

GSM Association, "Mobile NFC Services", Version 1.0, Feb. 2007, 24 pages.

Microsoft System Center Mobile Device Manager 2008—A Technical White Paper, 2008, 8 pages.

Mobile Europe, "Mobile payments—The need for co-operation", downloaded on Jun. 23, 2009 from http://www.mobileeurope.co.uk/features/11490/Mobile_payments_-The_need_for co-op . . . , 1 page.

Mobility Ware, "MobileAssist—Remote support for all you mobile devices", downloaded on Jun. 23, 2009 from http://www.mobilityware.com/MobileAssistProduct.htm, 2 pages.

Saunders, T., "Buying into NFC Payments", pp. 26-27. *Retail Systems*, Apr.-May 2009, pp. 26-27.

Sun Microsystems, "The Road to Mobile Banking—White Paper", Jun. 2008, 10 pages.

International Search Report and Written Opinion dated May 4, 2010 for PCT Patent Application No. PCT/US2009/057732, 18 pages.

Extended European Search Report dated Feb. 24, 2012 for EP Application No. 09815352.1, 7 pages.

Office Action dated Feb. 13, 2013 for EP Application No. 09815352.1, 3 pages.

Office Action dated Sep. 20, 2013 in Russian Patent Application No. 2011115811, 6 pages.

Patent Examination Report dated Apr. 24, 2014 in Australian Patent Application No. 2009292991, 5 pages.

Office Action dated Jul. 31, 2014 in Russian Patent Application No. 2011115811, 13 pages.

Office Action dated Mar. 19, 2014 in Mexican Patent Application No. MX/a/2011/003043, 7 pages.

Decision on Grant dated Apr. 21, 2015 for RU Patent Application No. 2011115811, with English Translation, 16 pages.

Patent Examination Report dated Dec. 18, 2014 in Australian Patent Application No. 2009292991, 5 pages.

Notice of Acceptance dated May 11, 2015 in Australian Patent Application No. 2009292991, 3 pages.

Krista Becker, Mobile Phone: The New Way to Pay? Feb. 2007, Federal Reserve Bank of Boston, web, 1-14.

Non-Final Office Action, dated Jan. 26, 2017, in U.S. Appl. No. 15/010,728, 11 pages.

Final Office Action, dated Aug. 24, 2017, in U.S. Appl. No. 15/0120,728, 12 pages.

\* cited by examiner

OVER THE AIR MANAGEMENT OF PAYMENT APPLICATION INSTALLED IN MOBILE DEVICE

CROSS REFERENCE TO RELATED APPLICATIONS

The present application is a Divisional Application of U.S. application Ser. No. 12/563,540, filed Sep. 21, 2009, entitled "OVER THE AIR MANAGEMENT OF PAYMENT APPLICATION INSTALLED IN MOBILE DEVICE", which claims benefit under 35 U.S.C. § 119(e) to U.S. Provisional Patent Application No. 61/099,060, entitled "Contactless Phone With Secret Data", filed Sep. 22, 2008, U.S. Provisional Patent Application No. 61/220,540, entitled "Customizable Passcode Feature", filed Jun. 25, 2009, and U.S. Provisional Patent Application No. 61/220,550, entitled "Mobile Communication Channel Induced Functionality", filed on Jun. 25, 2009. The contents of the above applications are hereby incorporated by reference in their entirety for all purposes.

BACKGROUND

Consumer payment devices are used by millions of people worldwide to facilitate various types of commercial transactions. In a typical transaction involving the purchase of a product or service at a merchant location, the payment device is presented at a point of sale terminal ("POS terminal") located at a merchant's place of business. The POS terminal may be a card reader or similar device that is capable of accessing data stored on the payment device, where this data may include identification or authentication data, for example. Some or all of the data read from the payment device is provided to the merchant's transaction processing system and then to the Acquirer, which is typically a bank or other institution that manages the merchant's account. The data provided to the Acquirer may then be provided to a payment processing network that is in communication with data processors that process the transaction data to determine if the transaction should be authorized by the network, and assist in the clearance and account settlement functions for the transaction. The authorization decision and clearance and settlement portions of the transaction may also involve communication and/or data transfer between the payment processing network and the bank or institution that issued the payment device to the consumer (the Issuer).

Although a consumer payment device may be a credit or debit card, it may also take the form of a "smart" card or chip. A smart card is generally defined as a pocket-sized card (or other portable payment device) that is embedded with a microprocessor and one or more memory chips, or is embedded with one or more memory chips with non-programmable logic. The microprocessor type card typically can implement certain data processing functions, such as to add, delete, or otherwise manipulate information stored in a memory location on the card. In contrast, the memory chip type card (for example, a prepaid phone card) can typically only act as a file to hold data that is manipulated by a card reading device or terminal to perform a pre-defined operation, such as debiting a charge from a pre-established balance stored in the memory. Smart cards, unlike magnetic stripe cards (such as standard credit cards), can implement a variety of functions and contain a variety of types of information on the card. Therefore, in some applications they may not require access to remote databases for the purpose of user authentication or record keeping at the time of a transaction. A smart chip is a semiconductor device that is capable of performing most, if not all, of the functions of a smart card, but may be embedded in another device.

Smart cards or chips come in two general varieties; the contact type and the contactless type. A contact type smart card or chip is one that includes a physical element (e.g., a magnetic stripe) that enables access to the data and functional capabilities of the card, typically via some form of terminal or card reader. A contactless smart card or chip is a device that incorporates a means of communicating with the card reader or point of sale terminal without the need for direct contact. Thus, such devices may effectively be "swiped" by passing them close to a card reader or terminal. Contactless cards or chips typically communicate with a card reader or terminal using RF (radio-frequency) technology, wherein proximity to the reader or terminal causes data transfer between the card or chip and the reader or terminal. Contactless cards have found uses in banking and other applications, where they have the advantage of not requiring removal from a user's wallet or pocket in order to participate in a transaction. A contactless card or chip may be embedded in, or otherwise incorporated into, a mobile device such as a mobile phone or personal data assistant (PDA). Further, because of the growing interest in such cards, standards have been developed that govern the operation and interfaces for contactless smart cards, such as the ISO 14433 standard.

The contactless card may be pre-authorized to conduct offline transactions. An offline transaction is one in which the card Issuer does not have to authorize the transaction at the time of conducting the transaction. The contactless smart card may be provisioned to conduct a set number of offline transactions or a set maximum value of offline transactions. The maximum number and/or accumulated value of off-line transactions can be set by the card Issuer. An internal counter can be implemented on the smart card or the payment application that keeps track of the number and/or accumulated value of the off-line transactions.

In a conventional system, when a user reaches the maximum number of off-line transactions as determined by the internal counter, no more off-line transactions are allowed. Currently there is no process for performing a contactless refresh/reset of the internal counter in the payment application. The user has to present his card at a point of sale (POS) terminal that can connect to the Issuer and request a counter reset through the POS terminal or any other suitable terminal that can accept the contactless card and communicate with the Issuer. Once the counter is reset, the user can once again perform off-line transactions. However, there are instances where the user may not have access to a POS terminal in order to request a counter reset. In such instances, the user is prevented from conducting offline transactions thereby limiting his access to goods and services.

Mobile phones are also becoming useful as payment devices. A mobile device such as a mobile phone may include a transaction payment application to enable the phone to be used as a portable consumer payment device when making purchases. The payment application typically permits a user to make payment for goods or services, and may be linked to a payment account of the device owner. A problem may arise in situations in which the mobile device is lost or stolen because someone other than the owner of the device may then have access to the payment application and be able to execute transactions without the approval of the payment account owner. This can be particularly troublesome if the payment account is a prepaid account, as whoever is in possession of the device may be able to make purchases as long as the account balance is positive.

The payment application may be protected by a password. The password may be used to control access to the payment application. Similar to the counter, currently, there is no mechanism to perform a contactless password reset in case the password for the payment application become inoperative.

Embodiments of the invention address these and other problems, individually and collectively.

SUMMARY

Embodiments of the present invention are directed to systems, apparatuses and methods for enabling and processing payment transactions, and more specifically, to systems and associated apparatuses and methods for managing a payment application resident on a mobile device, such as a mobile wireless phone. The management of the payment application includes disabling and enabling functions of the payment application, resetting a password associated with the payment application, or resetting a counter associated with the payment application. This permits an Issuer to protect against fraudulent use of the payment application in situations in which the mobile device is lost or stolen.

Embodiments of the present invention are directed to a system, apparatus, and method for managing a payment application installed on a mobile device, such as a mobile phone. In an embodiment, the present invention enables an Issuer of a payment device (note that a payment device may be alternately referred to as a portable consumer device) to remotely disable the payment application by instructing a wireless network carrier or operator to generate and transmit a message to the mobile phone, where the message contains an instruction to set access control data for the payment application. By setting the access control data to a predetermined value, unauthorized use of the payment application may be prevented in the situation in which the mobile phone is lost or stolen, or the Issuer desires to limit access to the payment application for another reason, such as because the account owner has become an undesirable customer. In other embodiments, a method for resetting a password associated with the payment application is provided. In some embodiments, a method for resetting a counter associated with the payment application is provided.

In one embodiment, the present invention is directed to a mobile wireless device, where the device includes a processor, a memory, a payment application installed on the mobile wireless device, and a set of instructions stored in the memory, which when executed by the processor implement a method to receive access control data for the installed payment application over a wireless network, and depending upon the access control data, enable the user to access a function of the payment application or prevent the user from accessing the function of the payment application.

In another embodiment, the present invention is directed to a method of controlling use of a payment application installed on a mobile device, where the method includes receiving an instruction at an element of a wireless communications network, the instruction being to enable or disable user access to a function of the payment application, in response to receiving the instruction, generating data representing the instruction in a form capable of being transmitted to the mobile device, and transmitting the generated data over a wireless network for receipt by the mobile device.

In yet another embodiment, the present invention is directed to a method of operating a mobile device, where the method includes receiving data including payment application access control data over a wireless network, storing the payment application access control data in a data storage of the mobile device, receiving an input and in response to the input, activating the payment application installed on the mobile device, accessing the data storage, and processing the payment application access control data in the data storage to determine if a user of the mobile device is provided access to a function of the payment application.

According to an embodiment of the present invention, a method for requesting an over-the-air reset of a counter associated with a payment application resident on a mobile device is provided. The method includes sending a counter reset request to an Issuer, over-the-air, using the mobile device, receiving a script from the Issuer, the script configured to reset the counter, and resetting the counter by executing the script sent by the Issuer.

In yet another embodiment, a method for requesting a password reset is provided. The password is associated with a payment application resident on a mobile device. According to this method, a user can request a password reset to the Issuer through the payment application on his mobile communication device. The mobile device can receive a script from the Issuer to reset he password once the Issuer has verified the user's identity.

An embodiment of the present invention provides a method for authenticating a user of a mobile device. The method comprises receiving a password for access to a payment application resident on a mobile device, and determining if the password is authentic, wherein the payment application allows a predetermined amount of password entry attempts, the predetermined amount being customizable by a consumer. Another embodiment of the invention provides a computer readable medium comprising code executable by a processor, the code for implementing the method for authenticating a user of a mobile device.

In some embodiments, the invention provides a method for customizing a payment application resident on a mobile device. The method comprises entering a password for access to a payment application resident on a mobile device from an authentic user of the mobile device, wherein the password allows access to the transaction application, and entering, by the authentic user, a password attempt value into the mobile device, wherein the password attempt value is used to determine the maximum number of password attempts that a person can try to access the transaction application. Yet, another embodiment of the invention provides a computer readable medium comprising code executable by a processor, the code for implementing the method for customizing a transaction application of a mobile device.

Other objects and advantages of the present invention will be apparent to one of ordinary skill in the art upon review of the detailed description of the present invention and the included figures.

DETAILED DESCRIPTION

The present invention is directed to a system, apparatus, and method for managing use of a payment application installed on a mobile device. The invention may be used to prevent unauthorized use of the payment application or of a function of the application. The invention may also be used to disable continued use of the payment application in situations in which an Issuer desires to limit access to the application by an existing customer, for example, because the customer has become undesirable or is suspected of fraud. In one embodiment, the invention may be used to reset a counter and/or a password associated with the payment system so that a user may continue to conduct transactions using the mobile device.

The present invention is typically implemented in the context of using a consumer payment device as part of a transaction; therefore prior to describing one or more embodiments of the invention in greater detail, a brief discussion of the entities involved in initiating, processing and authorizing a payment transaction, and their roles in the authorization process will be presented.

Figure 1:
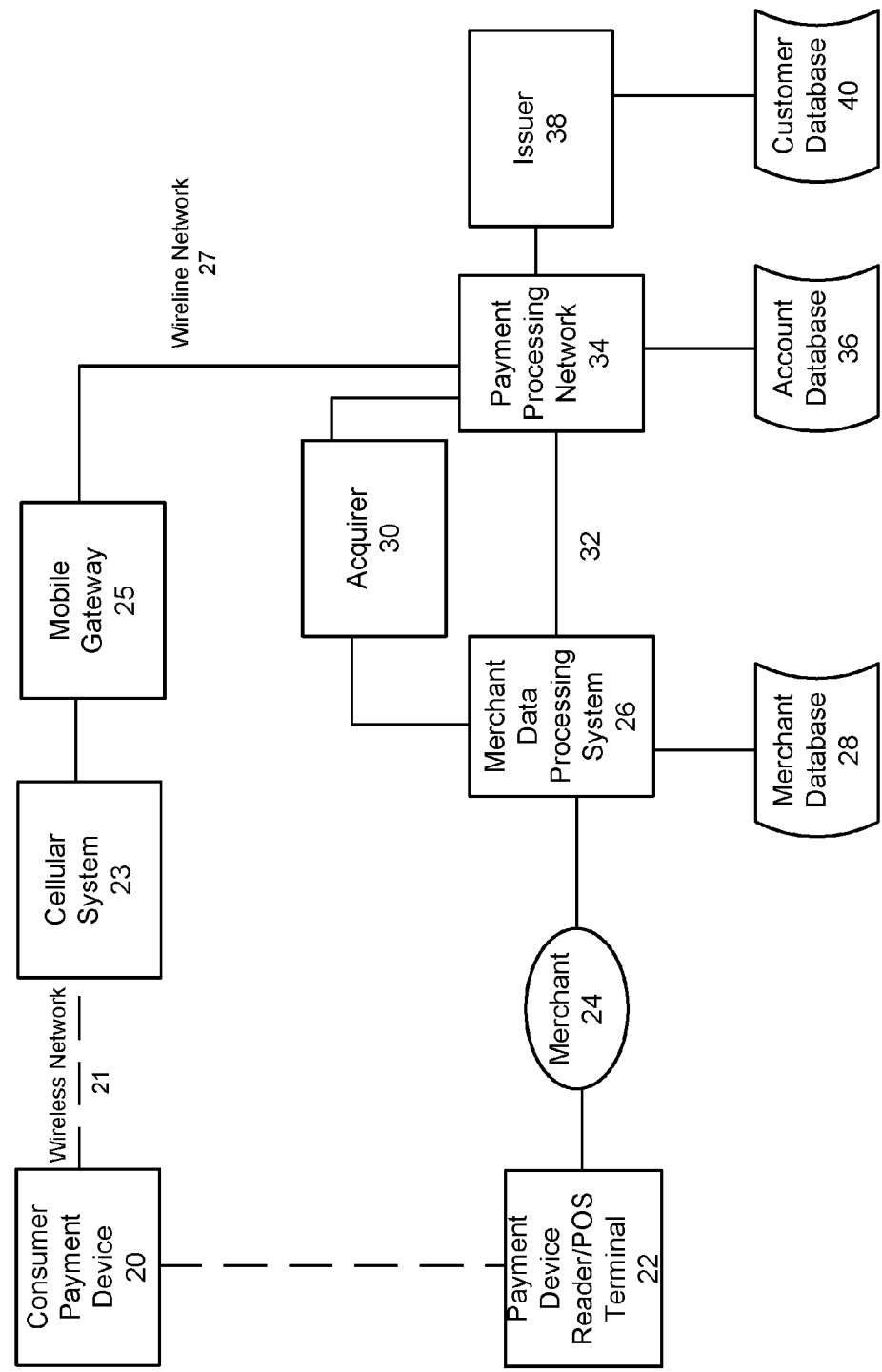
FIG. 1 is a block diagram illustrating a transaction processing system that may be used with some embodiments of the present invention.

FIG. 1 is a block diagram illustrating a transaction processing system for a transaction initiated using a consumer payment device, and that may be used with some embodiments of the present invention. Typically, an electronic payment transaction is authorized if the consumer conducting the transaction is properly authenticated (i.e., their identity and their valid use of a payment account is verified) and has sufficient funds or credit to conduct the transaction. Conversely, if there are insufficient funds or credit in the consumer's account, or if the consumer's payment device is on a negative list (e.g., it is indicated as possibly having been stolen), then an electronic payment transaction may not be authorized. In the following description, an "Acquirer" is typically a business entity (e.g., a commercial bank) that has a business relationship with a particular merchant. An "Issuer" is typically a business entity (e.g., a bank) which issues a payment device such as a credit or debit card to a consumer. Some entities may perform both Issuer and Acquirer functions.

FIG. 1 illustrates the primary functional elements that are typically involved in initiating and processing a payment transaction, and in the authorization process for such a transaction. As shown in FIG. 1, in a typical payment transaction, a consumer wishing to purchase a good or service from a merchant uses a consumer payment device 20 to provide payment transaction data that may be used during a transaction authorization process. The consumer payment device 20 may be a debit card, credit card, contact or contactless smart card, mobile device containing a contactless chip, or other suitable form of device. In the context of the present invention, consumer payment device 20 will generally be a mobile device capable of communication and data exchange over a wireless or cellular network (e.g., a mobile phone, personal digital assistant, or other device having wireless communications capability), although other types of devices may be used as part of implementing the invention.

In a transaction situation, the consumer payment device is presented to a payment device reader or point of sale (POS) terminal 22 which is able to access data stored on or within the consumer payment device. Payment device reader or point of sale (POS) terminal 22 may access data stored on payment device 20 by direct contact (such as by using a magnetic stripe reader) or by a contactless method (such as data exchange between a contactless chip contained in the device and the reader/terminal using a near field communications mechanism). The account data (as well as any required consumer data) is communicated from reader/terminal 22 to the merchant 24 and ultimately to the merchant's transaction/data processing system 26. As part of the authorization process performed by the merchant, merchant transaction processing system 26 may access merchant database 28, which typically stores data regarding the customer/consumer (as the result of a registration process with the merchant, for example), the consumer's payment device, and the consumer's transaction history with the merchant. Merchant transaction processing system 26 typically communicates with Acquirer 30 (which manages the merchant's accounts) as part of the overall authorization process.

Merchant transaction processing system 26 and/or Acquirer 30 provide data to Payment Processing Network 34, which among other functions, participates in the clearance and settlement processes that are part of the overall transaction processing. Communication and data transfer between Merchant transaction processing system 26 and Payment Processing Network 34 may be by means of a direct connection 32, or by means of an intermediary, such as Acquirer 30. As part of the transaction authorization process, Payment Processing Network 34 may access account database 36, which typically contains information regarding the consumer's account payment history, chargeback or dispute history, credit worthiness, etc. Payment Processing Network 34 communicates with Issuer 38 as part of the authorization process, where Issuer 38 is the entity that issued the payment device to the consumer and manages the consumer's account. Customer or consumer account data is typically stored in customer/consumer database 40, which may be accessed by Issuer 38 as part of the authorization and account management processes.

In the case of payment device 20 being capable of communications and/or data exchange using a wireless communications system (such as for the case of a mobile phone or wireless equipped personal digital assistant), payment device 20 may communicate and/or exchange data with cellular system 23 over a wireless network 21. Cellular system 23 is capable of communication and data exchange with mobile gateway 25, which acts to couple the wireless network to a wireline network 27 (such as parts of the Internet). Mobile gateway 25 is capable of communication and data exchange with payment processing network 34, typically by means of wireline network 27 (e.g., such as parts of the Internet). As mentioned, in some embodiments, the consumer payment device may be a wireless mobile phone that incorporates a contactless card or chip. The contactless card or chip may communicate with a device reader/point of sale terminal using a near field communications (NFC) capability, such as a RF, infrared or optical communications mechanism.

In standard operation, an authorization request message is created during a consumer's purchase of a good or service at a point of sale (POS) using a consumer payment device. The authorization request message is typically sent from the device reader/POS terminal 22 through the merchant's data processing system 26 to the merchant's Acquirer 30, to a payment processing network 34, and then to an Issuer 38. An authorization request message can include a request for authorization to conduct an electronic payment transaction. It may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent data from being compromised.

After the Issuer receives the authorization request message, the Issuer sends an authorization response message back to the payment processing network or system to indicate whether or not the current transaction is authorized. The payment-processing network then forwards the authorization response message to the Acquirer. The Acquirer then sends the response message to the Merchant. The Merchant is thus made aware of whether the Issuer has authorized the transaction, and hence whether the transaction can be completed.

At a later time, a clearance and settlement process can be conducted by the payment/transaction processing system. A clearance process involves exchanging financial details between an Acquirer and an Issuer to facilitate posting a transaction to a consumer's account and reconciliation of the consumer's settlement position. Clearing and settlement can occur simultaneously.

Payment Processing Network 34 may include data processing subsystems, networks, and other means of implementing operations used to support and deliver authorization services, exception file services, and clearing and settlement services for payment transactions. An exemplary Payment Processing Network may include VisaNet™. Payment Processing Networks such as VisaNet™ are able to process credit card transactions, debit card transactions, and other types of commercial transactions. VisaNet™, in particular, includes a VIP system (Visa Integrated Payments system) which processes authorization requests and a Base II system, which performs clearing and settlement services.

Payment Processing Network 34 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment Processing Network 34 may use any suitable combination of wired or wireless networks, including the Internet, to permit communication and data transfer between network elements. Among other functions, Payment Processing Network 34 may be responsible for ensuring that a user is authorized to conduct the transaction (via an authentication process), confirm the identity of a party to a transaction (via receipt of a personal identification number), confirm a sufficient balance or credit line to permit a purchase, or reconcile the amount of a purchase with the user's account (via entering a record of the transaction amount, date, etc.).

As noted, consumer payment device 20 may take one of many suitable forms. The consumer payment device can be a mobile device that incorporates a contactless element such as a chip for storing payment data (e.g., a BIN number, account number, etc.) and a near field communications (NFC) data transfer element such as an antenna, a light emitting diode, a laser, etc. The device containing the contactless card or chip, or other data storage element may be a cellular (mobile) phone, personal digital assistant (PDA), pager, transponder, or the like. The consumer payment device may also incorporate the ability to perform debit functions (e.g., a debit card), credit functions (e.g., a credit card), or stored value functions (e.g., a stored value or prepaid card).

In embodiments of the invention that include a contactless element (which may include a contactless chip and near field communications data transfer element) embedded within a wireless mobile phone or similar device, the contactless element can communicate with a merchant's device reader or point of sale terminal using a short range communication method, such as a near field communications (NFC) capability. Examples of such NFC technologies include ISO standard 14443, RFID, Bluetooth™ and Infrared communications methods.

Figure 2:
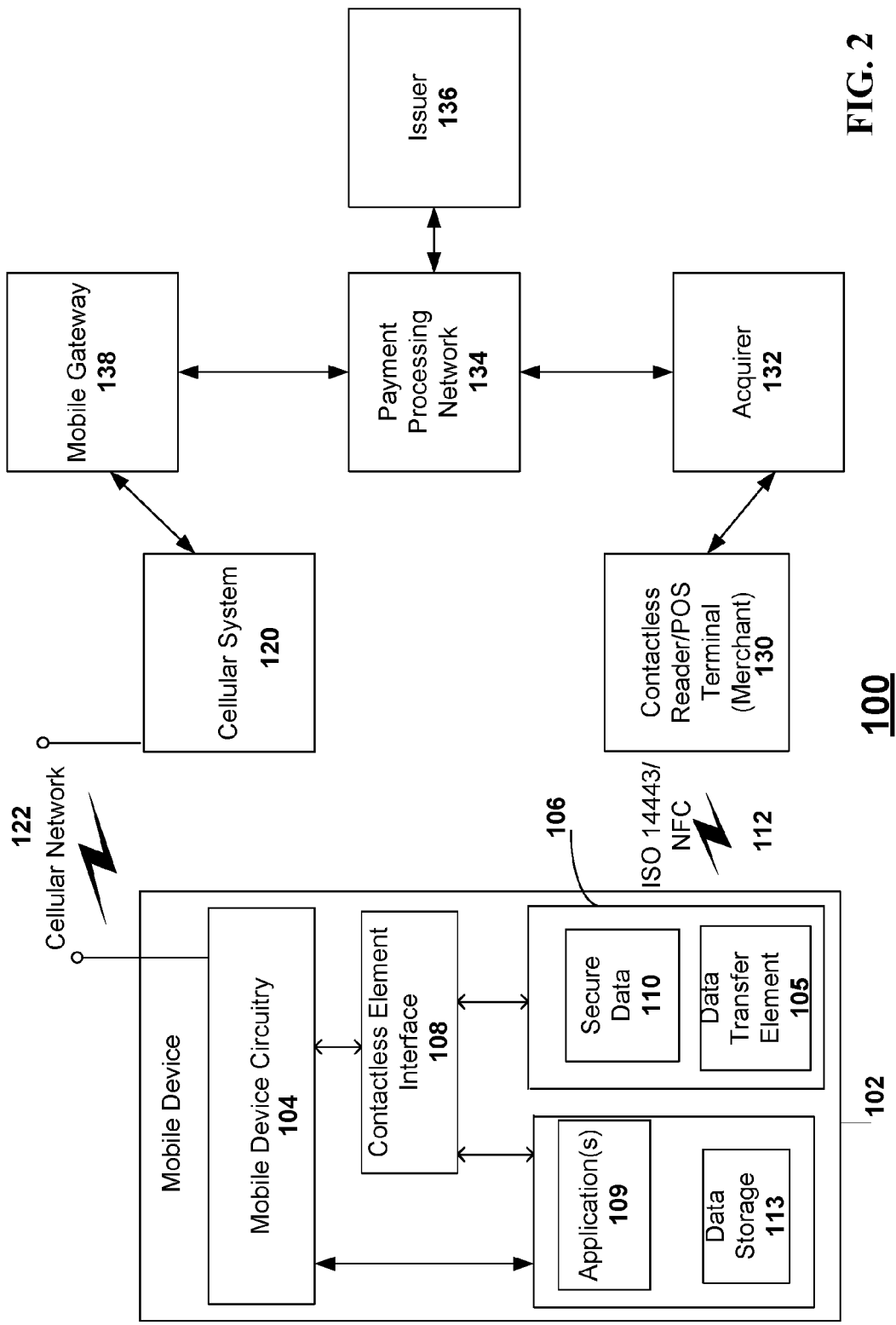
FIG. 2 is a functional block diagram illustrating the primary components of a system for disabling the operation of a payment application that is installed in a mobile phone or other wireless device, in accordance with an embodiment of the present invention.

FIG. 2 is a functional block diagram illustrating the primary components of a system 100 for disabling the operation of a payment application that is installed in a mobile phone or other wireless device, in accordance with an embodiment of the present invention. As shown in FIG. 1, system 100 includes a mobile device 102 having wireless communications capabilities 122. Mobile device 102 may be a wireless mobile telephone, PDA, laptop computer, pager, etc. In a typical embodiment, mobile device 102 is a cell phone, although as noted, implementation of the present invention is not limited to this embodiment. In the case of a cell phone as the mobile device 102, the device includes mobile device (cell phone) circuitry 104 that enables certain of the telephony functions. Among other functions, mobile device circuitry 104 enables mobile device 102 to communicate wirelessly with cellular system (i.e., a wireless carrier) 120 via cellular network 122. Mobile device circuitry 104 may also include circuitry that enables other functions of the device, such as data input, data output, data display, data processing, etc.

Mobile device 102 further includes a contactless element 106, typically implemented in the form of a semiconductor chip. Contactless element 106 may include a secure data storage element 110, although secure data storage element 110 may also be implemented as a separate element from contactless element 106. Contactless element 106 also includes a near field communications (NFC) data transfer (e.g., data transmission) element 105, such as an antenna or transducer. Contactless element 106 is typically embedded within and integrated with the elements of mobile device 102, and data or control instructions transmitted via cellular network 122 may be exchanged with or applied to contactless element 106 by means of contactless element interface 108. Contactless element interface 108 functions to permit the exchange of data and/or control instructions between mobile device circuitry 104 (and hence the cellular network) and contactless element 106. Thus, contactless element 106 may include data storage capability in the form of a memory or secure data storage 110 that may be accessed via interface 108 to permit the implementation of data read, write, and erase functions, for example. Access to secure data storage 110 may be controlled by requiring some form of authentication or the provision of security/access control data to enable data to be read, written, or otherwise operated on. Authentication or security/access control data may also be required to in order to activate an application or function stored in secure data storage 110. Contactless element 106 may further include one or more counters. The counters may be used to track various aspects of user input and information related to transactions, e.g., number of password entry attempts by the user, number of offline transactions conducted, total amount of offline transactions, etc. An offline transaction is one in which the card Issuer does not have to authorize the transaction at the time of conducting the transaction.

Secure data space 110 may be used by mobile device 102 to store operating parameters or other data utilized in the operation of the device. Secure data space 110 may also be used to store other data for which enhanced security is desired, for example, transaction data, personal account data, identification data, authentication data, operating parameters for an application, access control data for an application or device function, etc. Secure data space 110 may be implemented in the form of a chip that is separate and apart from contactless element 106, or alternatively, may be a section of memory in a chip that forms part of contactless element 106. Note that the secure data space and/or contactless element contained within the mobile device may be a removable element or may be integrated within the mobile device. Examples of removable elements include SIM cards, flash memory cards, and other suitable devices.

Mobile device 102 may also include one or more applications 109 that are implemented in the form of one or more of software, firmware, or hardware, and which are used for implementing various functions desired by a user. Such functions may include, but are not limited to, ecommerce transaction operations, transaction payment operations, etc. Typically, applications 109 represent processes or operations that are dedicated to a specific function that provides added value to the user and which are not part of the standard operation of the device (i.e., not part of enabling the standard telephony functions, for example). As shown in the figure, applications 109 may exchange data with secure data space 110 (via contactless element interface 108) and may also be capable of exchanging data with mobile device circuitry 104. A typical application 109 for the purposes of the present invention is a payment application that enables a user to make payments for a transaction, where the transaction is wholly or partially executed using the mobile device. In such an example, secure data space 110 may contain authentication data, user identification data, transaction record data, account balance data, etc. Applications 109 are typically stored as a set of executable instructions in memory 107, which may also include data storage 113. A processor accesses memory 107 to load and unload the instructions and the data as needed to execute the instructions and perform the functions of the applications.

Contactless element 106 is capable of transferring and receiving data using data transfer element 105 which implements a near field communications capability 112, typically in accordance with a standardized protocol or data transfer mechanism (identified as ISO 14443/NFC in the figure). Near field communications capability 112 is a short-range communications capability, such as RFID, Bluetooth™, infra-red, or other data transfer capability that can be used to exchange data between the mobile device 102 and a device reader or point of sale terminal 130, which is typically located at a Merchant's place of business. Thus, mobile device 102 is capable of communicating and transferring data and/or control instructions via both cellular network 122 and near field communications capability 112.

System 100 further includes Acquirer 132, which is in communication with Merchant 130 or Merchant's device reader or point of sale terminal. Acquirer 132 is in communication with Payment Processing Network 134 and as was described, may exchange data with Payment Processing Network 134 as part of the transaction authorization process. Payment Processing Network 134 is also in communication with Issuer 136. As was described, Issuer 136 may exchange data with Payment Processing Network 134 as part of the transaction authorization or transaction reconciliation process.

System 100 may also include Mobile Gateway 138, which is capable of coupling the cellular (wireless) network or system to a second network (typically a wireline network such as the Internet) and enabling the transfer of data between the networks. Mobile Gateway 138 may perform data processing operations as needed to permit the efficient transfer of data between the two types of networks, including, but not limited to, data reformatting or other processing to take into account differences in network protocols. Mobile Gateway 138 may also perform data processing operations to enable more efficient data transfer between the networks and devices coupled to each type of network, such as for purposes of improving the ability of a user to utilize the received data on a mobile device.

Data stored in the mobile device may include authentication and account management data, such as transaction records or account balances. For example, a secure data store (e.g., secure data space 110 or a similar secure memory region that is part of the mobile device or the contactless element) may contain transaction records and a running total of the balance available for a user's account. In the case of the contactless element being used with a prepaid card or account, the balance would reflect the remaining amount of money available to a user. In the case of the contactless element being used with a credit or debit account, the balance would reflect a remaining credit limit or amount available from the debit account.

Figure 3:
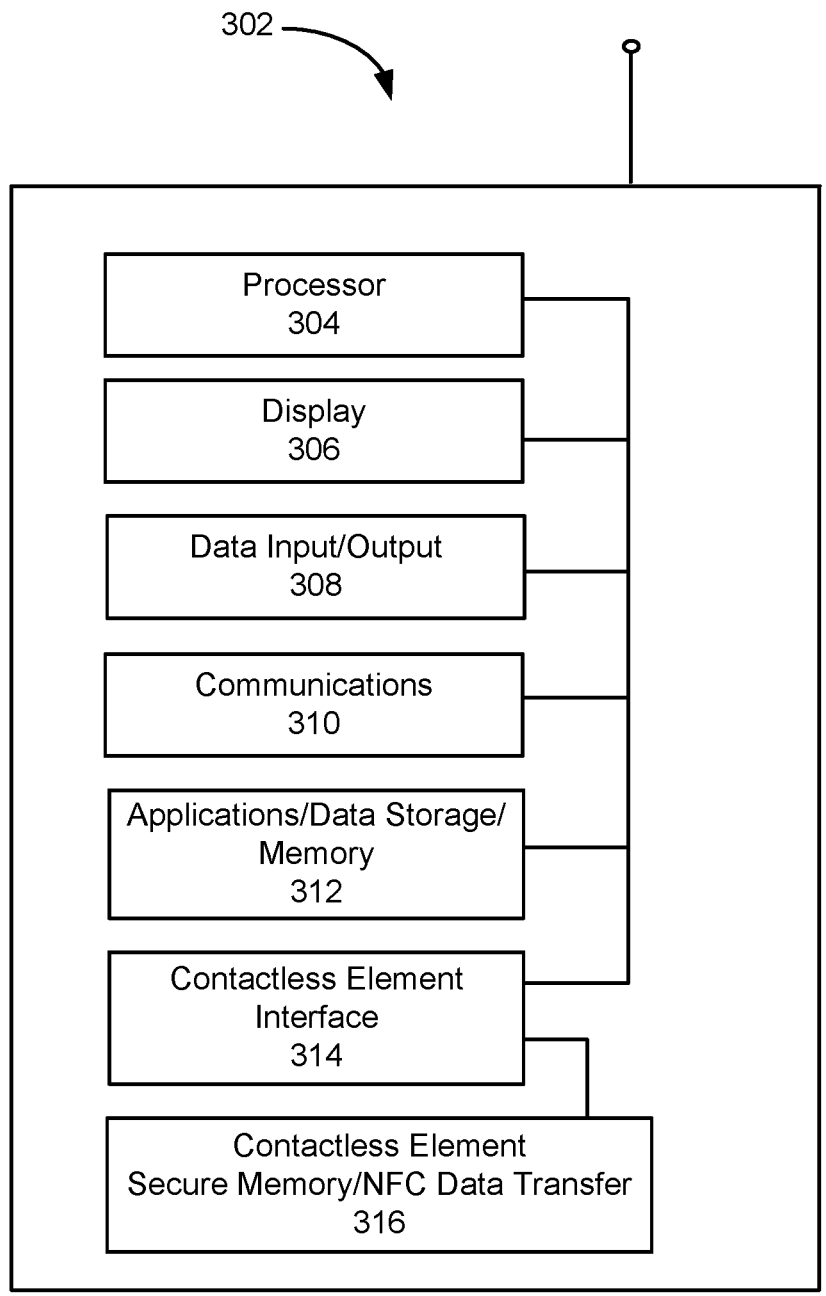
FIG. 3 is a functional block diagram illustrating the primary components of a mobile device, such as a mobile phone that may be used as part of the inventive system and method.

In the context of the present invention, mobile device 102 may be any device capable of communication and data transfer with a cellular network and, if desired, with a near field communication system. As noted, one example is a mobile wireless phone. FIG. 3 is a functional block diagram illustrating the primary components of a portable consumer device (e.g., element 102 of FIG. 2), such as a mobile phone that may be used as part of the inventive system and method. As illustrated in FIG. 3, mobile device 302 may include circuitry that is used to enable certain telephony and other device functions. The functional elements responsible for enabling those functions may include a processor 304 for executing instructions that implement the functions and operations of the device. Processor 304 may access data storage 312 (or another suitable memory region or element) to retrieve instructions or data used in executing the instructions. Data input/output elements 308 may be used to enable a user to input data (via a microphone or keyboard, for example) or receive output data (via a speaker, for example). Display 306 may also be used to output data to a user. Communications element 310 may be used to enable data transfer between device 302 and a wireless network (via antenna 318, for example) to assist in enabling telephony and data transfer functions. As described with reference to FIG. 2, device 302 may also include contactless element interface 314 to enable data transfer between contactless element 316 and other elements of the device, where contactless element 316 may include a secure memory and a near field communications data transfer element.

Data storage 312 may be a memory that stores data, and may be in any suitable form including a magnetic stripe, a memory chip, etc. The memory may be used to store data such as user identification or authentication information, user account information, transaction data, etc. Stored financial information may include information such as bank account information, bank identification number (BIN), credit or debit card number information, account balance information, expiration date, consumer information such as name, date of birth, etc. Note that such data may instead or also be stored in a secure data storage element, such as secure data storage 110 of FIG. 2 or a secure memory that is part of contactless element 316. As described, data storage 312 may also contain instructions which when executed by processor 304 implement operations or processes that are part of the operation of the device or of an application that is installed in the device. Further, a secure memory that is part of contactless element 316 may also store instructions which when executed by processor 304 implement an application, operations or processes related to operation of the device or execution of an application installed in the device.

As mentioned, one possible type of application that may be installed in the mobile device is a payment application that permits a user to conduct a transaction to purchase a good or service, and to make payment for that transaction. In some embodiments, the payment application may be used with a prepaid account having a balance stored on the device. A problem can arise if the mobile device is lost or stolen, as an unauthorized user may then be able to access the payment application and fraudulently enter into transactions. This problem can be even more severe if the device includes a prepaid account, as the unauthorized user may be able to conduct transactions using the balance of the account (which typically cannot be blocked, as can transactions conducted using a credit or debit account maintained by an Issuer).

In order to overcome the problems that may arise if a mobile device that is capable of being used for payment transactions is lost or stolen, the present invention includes use of control data to enable or disable use of a payment application installed on a mobile device. The control data can take the form of a flag, an indicator, a set of data bits, etc. that can take on one or more values. Depending on the value or values of the control data, the payment application may be enabled, disabled, or limited in functionality. The control data may be stored in a secure data storage region of a contactless element or other data storage region of the device. In some embodiments, when the payment application is activated, the application checks for the value of the control data. If the control data has the proper value to enable use of the payment application, then the payment application is enabled and a user may conduct transactions and make payments for purchases of goods or services.

Note that in some embodiments, the payment application may have a set of functions or operations that may be enabled, with the specific functions or operations enabled depending upon the value(s) of the control data. As an example, use of the payment application for certain types or amounts of purchases may be enabled or disabled by the value(s) of the control data. If the control data does not have the proper value to enable use of the payment application (or of certain functions or uses of the payment application), then the payment application (or those functions or uses) is disabled. In that situation, a user may not be able to use the device to conduct transactions and make payments for purchases of goods or services, or will be limited with respect to the uses of the payment application. The value or values of the control data may be set remotely using the wireless/cellular network, the near field communications capability, or both.

I. Conducting Payment Transactions

Figure 4:
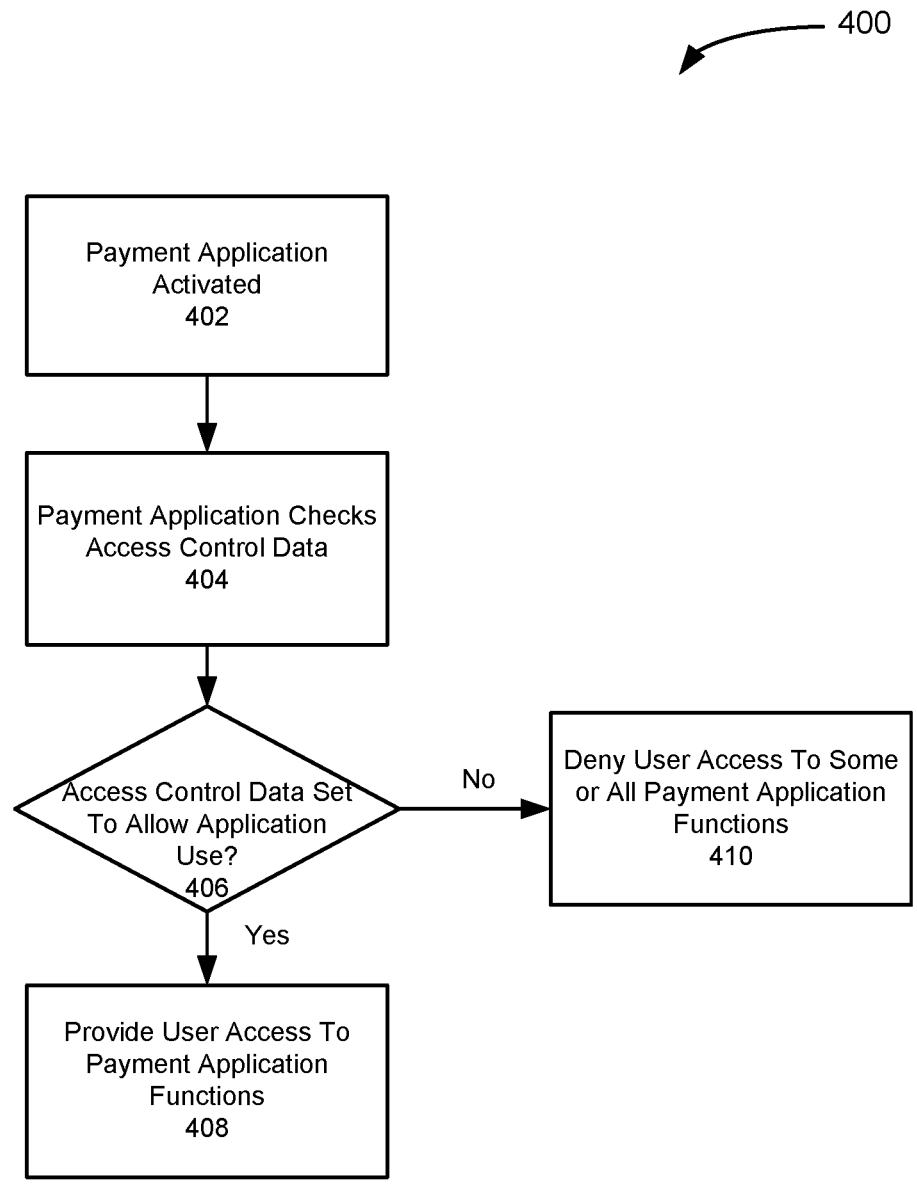
FIG. 4 is a flowchart illustrating a process or operation for using a payment application to conduct a transaction, in accordance with an embodiment of the present invention.

FIG. 4 is a flowchart illustrating a process or operation for using a payment application to conduct a transaction, in accordance with an embodiment of the present invention. The process steps or stages illustrated in the figure may be implemented as an independent routine or process, or as part of a larger routine or process. Note that each process step or stage depicted may be implemented as an apparatus that includes a processor executing a set of instructions, a method, or a system, among other embodiments.

As shown in the figure, a payment device is used to provide payment for a transaction. Depending on the transaction, the payment device may be used to initiate or otherwise conduct a transaction as a result of communication between the payment device and a Merchant device reader or point of sale terminal. The payment device may be a mobile wireless phone or similar device that includes a contactless element, for example. As discussed, the contactless element is capable of communication and data transfer using a near field communications capability. The transaction may be conducted by passing the payment device near the device reader or point of sale terminal to permit the payment device and device reader or terminal to establish communications and exchange data. In some embodiments, the transaction may be initiated by executing a command or instruction on the mobile device, or by another suitable method.

At stage 402, the payment application is activated. This may involve "launching" the payment application as the result of a user input (e.g., a keystroke, softkey activation, depressing a button, voice input, or other user interaction with a user interface element). In some embodiments, activation of the payment application may require an authentication process that ensures the user is properly authorized to utilize the application (e.g., entry and authentication of a password or other security data). At stage 404, the payment application checks the state or status of the application access control data. The application access control data may be of any suitable form, including, but not limited to, a data value, an indicator flag, a set of data values, an alphanumeric data string, the presence or absence of data in a specific data location, etc. The application access control data may be stored in any suitable place, for example, a secure memory location in the device (such as one that is part of a contactless element) or a memory that stores data and executable instructions and which is part of the mobile device. At stage 406, the process checks to determine if the value of the payment application access control data is such that use of the payment application is allowed. This may involve reading data stored in a specified location in memory and comparing it to one or more predetermined values, where the values correspond to possible states of operation of the payment application. If the value of the payment application access control data corresponds to one that allows use of the application, then the user is provided with access to the payment application functions (stage 408), such as those needed to conduct and pay for a transaction. If the value of the payment application access control data does not correspond to one that allows use of the application (or corresponds to one that denies a user access to some or all functions of the payment application), then the user is not provided with access to some or all of the payment application functions (stage 410). Note that as mentioned, the payment application access control data may be used to permit or deny access to certain features or functions of the payment application, such as by limiting use of the application to certain amounts (e.g., a maximum transaction amount for a single or multiple transaction, or during a specific timeframe), preventing certain types of transactions, etc.

II. Disabling Payment Application

Figure 5:
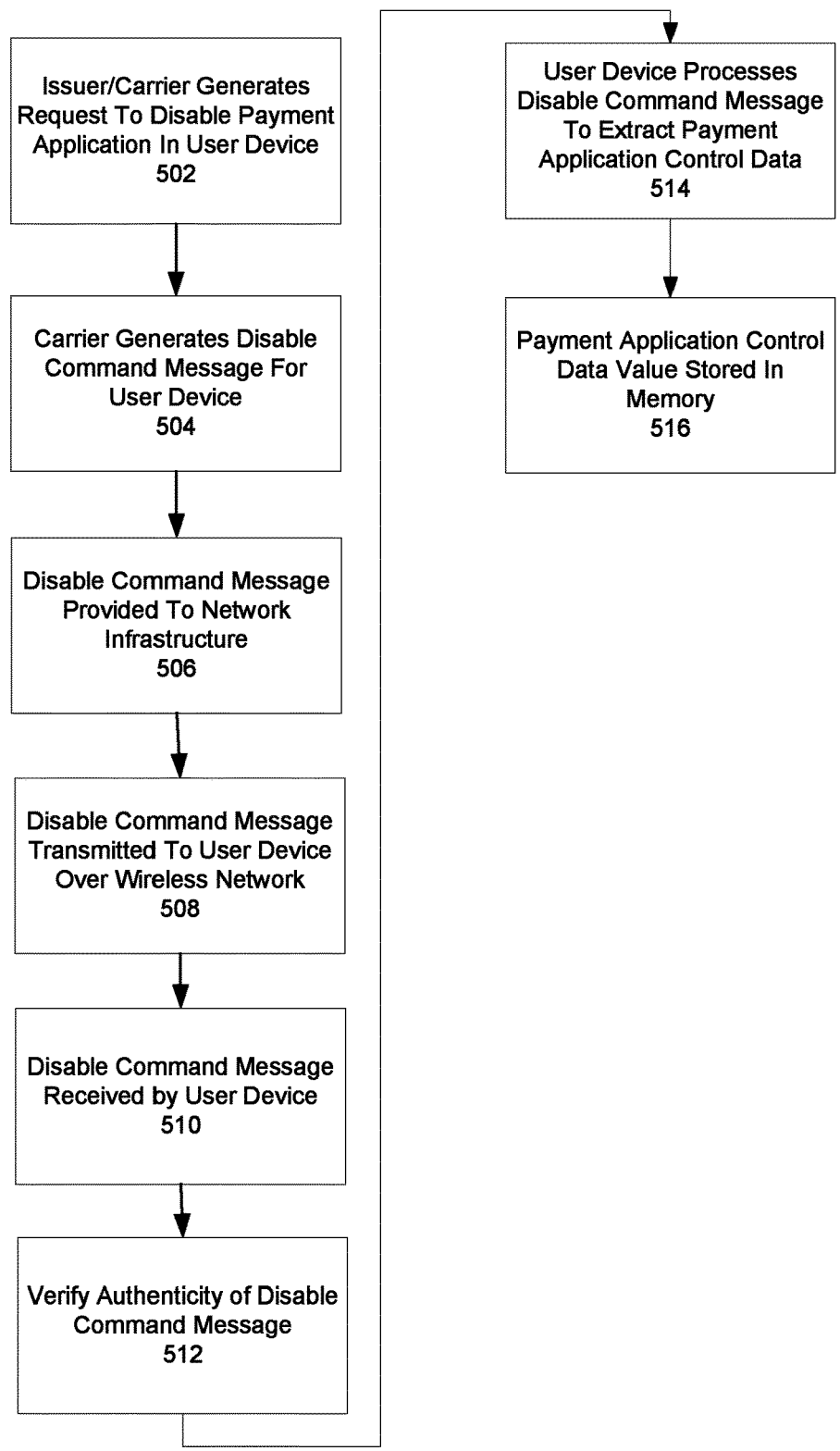
FIG. 5 is a flowchart illustrating a process or operation for disabling the use of a payment application installed on a mobile device, in accordance with an embodiment of the present invention.

FIG. 5 is a flowchart illustrating a process or operation for disabling the use of a payment application installed on a mobile device, in accordance with an embodiment of the present invention. The inventive process illustrated in FIG. 5 may be used in situations in which a mobile payment device, such as a mobile phone, is lost or stolen and it is desired to prevent an unauthorized person from using a payment application installed on the device. The process may also be used to enable an Issuer to disable the payment application on a device belonging to a previously authorized customer who is no longer authorized to use that application. The process steps or stages illustrated in the figure may be implemented as an independent routine or process, or as part of a larger routine or process. Note that each process step or stage depicted may be implemented as an apparatus that includes a processor executing a set of instructions, a method, or a system, among other embodiments.

As shown in FIG. 5, in the event that a mobile payment device is lost or stolen (or an Issuer desires to disable the payment application for other reasons), an Issuer or wireless network operator (such as a wireless carrier) is notified of the event. This may occur, for example, because the owner of a mobile phone reports to a wireless network operator that the phone has been lost or stolen. The operator then informs the Issuer responsible for the owner's payment account that the payment device associated with that account is no longer in the possession of the registered owner. The Issuer or network operator/carrier then generates a request to disable the payment application installed on the payment device (stage 502). The request may be to disable all operations/functions of the payment application, or to disable some subset of the available payment application operations. In response to the request, the network operator/carrier generates a disable command message for the payment device (stage 504). The disable command message may be in one of many suitable forms. These include, but are not limited to, a SMS (short message system) message, an email message, a format recognized as control data, etc. The message may include one or more payment application access control data values, such as a SMS code or codes, data values contained in a message header, etc.

The disable command message is then provided to the cellular network infrastructure (stage 506), and transmitted over the wireless network to the payment device (stage 508). In the case of a SMS message, the message maybe "pushed" to the device using methods well understood in the art of mobile messaging. The disable command message is received by the payment device (stage 510), which may then check to determine if the received message is authentic (stage 512). This may involve checking to determine if the message was sent by a valid source, such as the appropriate network operator, or if the message contains data identifying the Issuer for the account associated with the payment application, etc. If the message is determined to be authentic, then the payment device processes the received message to extract the payment application control data (stage 514) and stores the extracted data in the appropriate memory or data storage region of the payment device (stage 516).

As a result of the operations described with reference to FIG. 5, when the payment application is next activated and the access control data is checked (as described with reference to FIG. 4), the user will be denied access to some or all of the payment application functions. In this way, if the mobile device is lost or stolen, the payment application resident on the device can be wholly or partially disabled, thereby preventing an unauthorized user from conducting a payment transaction using the device. The capability to remotely disable the payment application is particularly useful in cases of the device including a prepaid balance account, as the invention may be used to prevent someone other than the owner of the device from using the prepaid balance to purchase good or services.

Disabling the payment application is one aspect of managing the payment application. In some embodiments, after the set number and/or value of offline transactions is reached, the user may not be able to use the payment device to conduct any more offline transactions. The counter needs to be reset in order to resume offline transactions. In certain instances, the user may not have access to a POS terminal to request a counter reset by the Issuer.

III. Counter Reset

Figure 6:
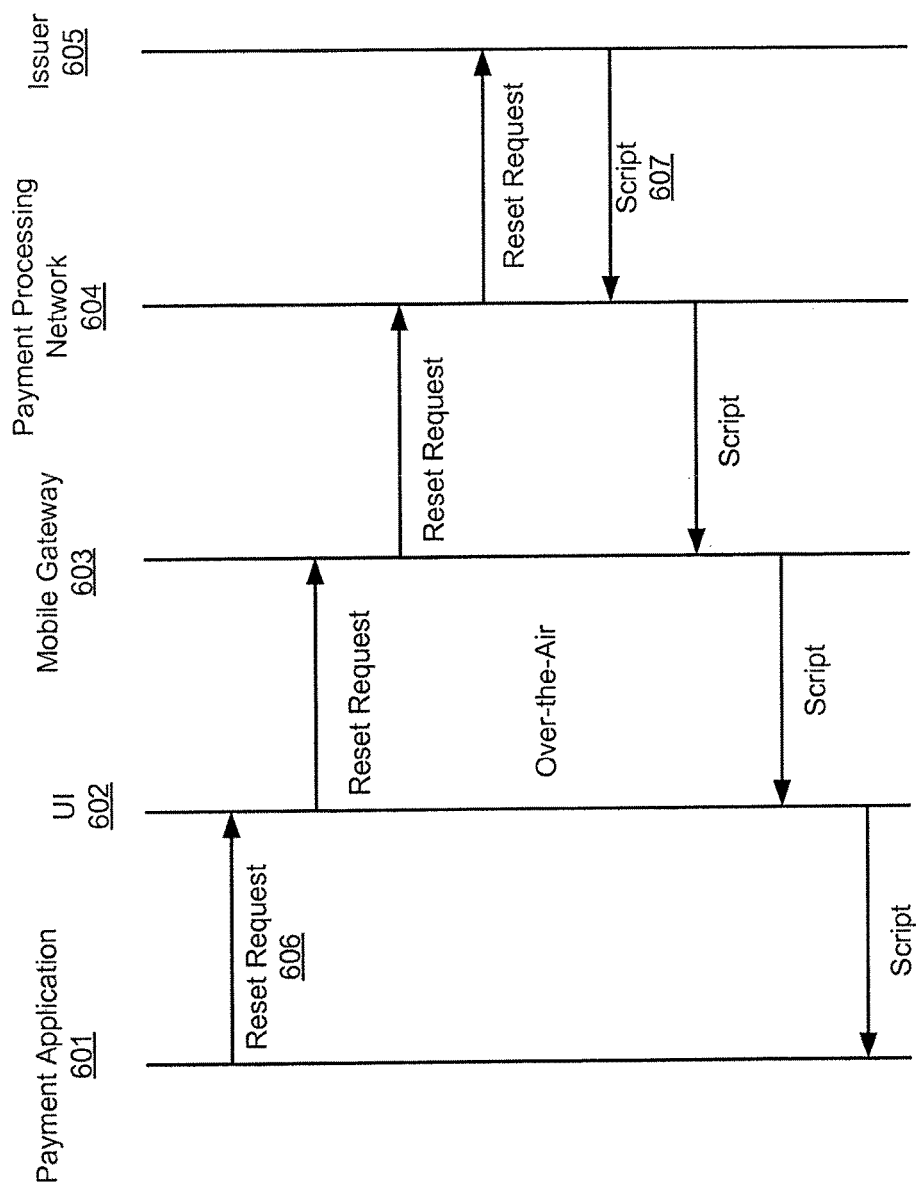
FIG. 6 is a data flow diagram illustrating communication flow for a method for resetting a counter according to an embodiment of the present invention.

FIG. 6 shows a data flow diagram illustrating a communication path between a user's mobile device, which includes a payment application 601, and an Issuer 605 for a counter reset operation. In one embodiment, a counter reset request 606 from payment application 601 is communicated to a mobile gateway 603 via a payment application user interface (UI) 602. Payment application 601 resident on the mobile device may send a reset request to its associated UI 602. UI 602 may send the request to mobile gateway 603 using an over-the-air communication channel, e.g., cellular phone network. Mobile gateway 603 communicates with Issuer 605 via a payment processing network 604, e.g., VisaNet, and forwards the request to Issuer 605. In effect, mobile gateway 603 acts as an Acquirer for transaction clearance network 604 and Issuer 605. Issuer 605 may send a response script 607 to mobile gateway 603 via network 604, which in turn may forward response script 607 to the user's mobile device for execution by payment application 601. In some embodiments, the request may be sent directly to Issuer 605 without the need for mobile gateway 603.

Figure 7:
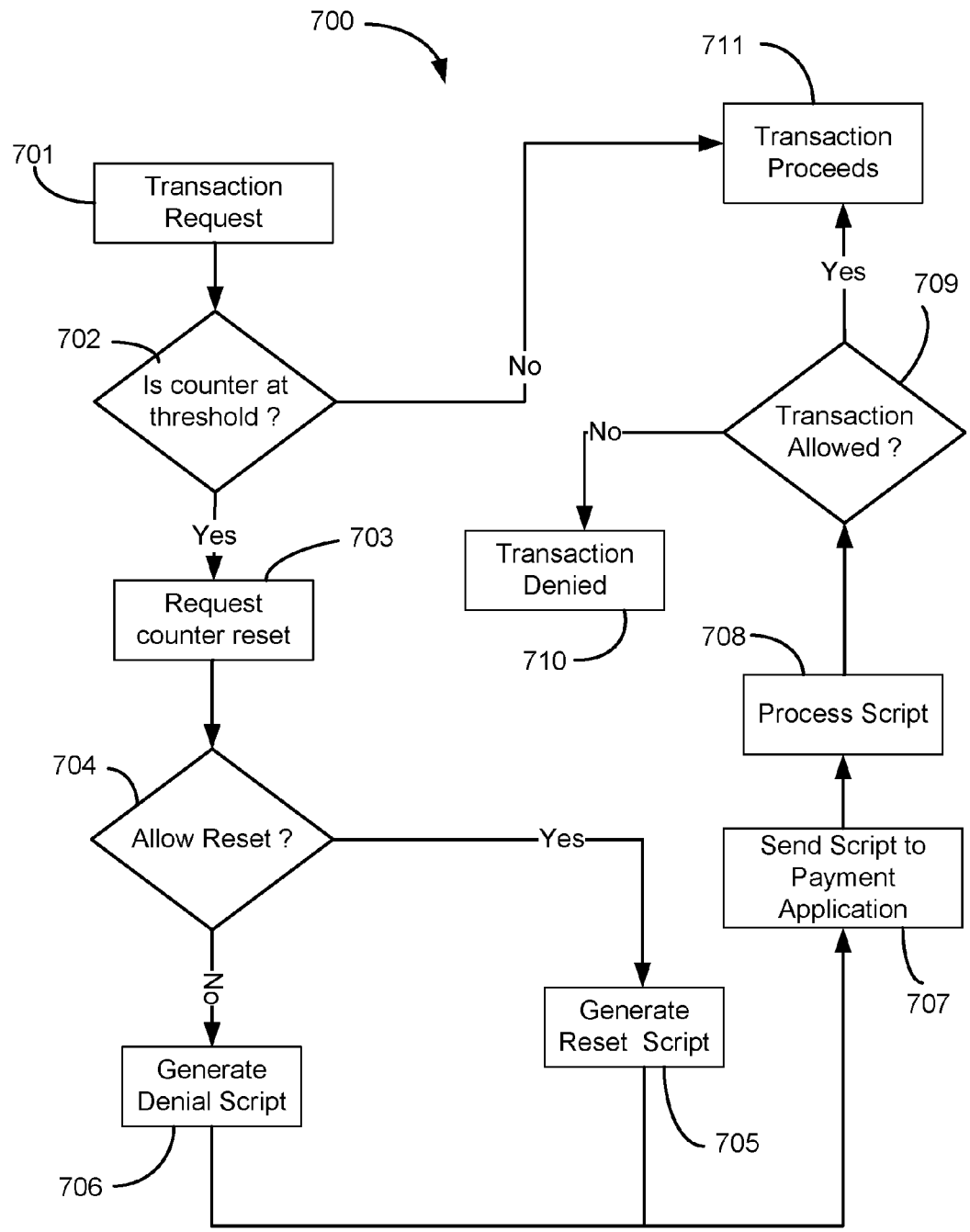
FIG. 7 is a flow diagram for a process of resetting a counter associated with a payment application according to an embodiment of the present invention.

FIG. 7 shows a flow diagram of a process 700 for a method for processing a request for a counter reset according to an embodiment of the present invention. At stage 701, the user requests an offline transaction. The payment application checks whether the counter has reached the threshold value at stage 702. In some embodiments, the Issuer can predetermine the threshold value for the counter and configure the contactless element in the mobile device accordingly. In an embodiment, the threshold value may represent number of offline transactions allowed before a reset is needed, e.g., 20 offline transactions. In other embodiments, the threshold value may be maximum accumulated value of offline transactions allowed before a counter reset is needed, e.g., $100. In yet other embodiment, the threshold value may be a combination of several criteria. If it is determined at stage 702 that the counter has not reached the threshold value, the transaction is allowed to proceed at stage 711. In the event that the counter has reached the threshold value as determined at stage 702, the payment application sends a counter reset request to the Issuer at stage 703.

As described above, the counter reset request may be communicated via a mobile gateway and a transaction clearance network. The Issuer may determine whether the counter is to be refreshed/reset at stage 704. In one embodiment, the Issuer may use one or more predetermined criteria for evaluating the request and apply its business rules to determine whether the counter should be reset or not. If the Issuer determines that the counter should be reset, the Issuer generates a script for resetting the counter at stage 705. A script may be an executable code that includes instructions for an operation to be performed, e.g., reset the counter. If it is determined that the counter should not be reset, an alternative script is generated by the Issuer at stage 706. The generated script is communicated to the payment application at stage 707. The payment application processes the script at stage 708 and determines, at stage 709, whether the script is to reset the counter and thereby allow the transaction to proceed or whether the script is to deny the counter reset/refresh request thereby denying the transaction. If the script is for resetting/refreshing the counter, the counter is reset and the transaction is allowed to proceed at stage 711. If the script contains instructions to deny the counter reset request, the counter is not reset and consequently the transaction is denied at stage 710. In the event that the transaction is denied, the user may have to use a POS terminal for resetting the counter. In some embodiments, the user may be presented with a message on the mobile device asking him to contact the issuer to reset the counter.

It will be appreciated that process 700 described herein is illustrative and that variations and modifications are possible. Acts described as sequential can be executed in parallel, order of acts can be varied, and acts can be modified or combined.

In some embodiments, the Issuer may grant permission to a third party to receive counter reset requests on its behalf and issue appropriate scripts. The Issuer may provide a set of predetermined policies to the third party, which the third party may use to evaluate the counter reset request. The third party may be a provisioning entity that configures the mobile device with the contactless card and the payment application, an authorized representative of the Issuer tasked with performing the counter reset/refresh, or a payment clearance entity that has an existing trusted relationship with the Issuer for payment clearance on the Issuer's behalf.

In an embodiment, the payment application may be accessible using a password or password. Access to the payment application can thus be controlled effectively and in instances where the mobile device is lost or stolen, an unauthorized person cannot use the payment application. The password for the payment application may be same or different from the password used for access to other features of the mobile device. However, in some instances, the authorized user of the mobile device may forget his password or the password may become locked preventing him from using the payment application. One way to reset the password may be for the user to contact the Issuer and request a password reset. However, this method could be very time consuming and inconvenient.

IV. Password Reset

Figure 8:
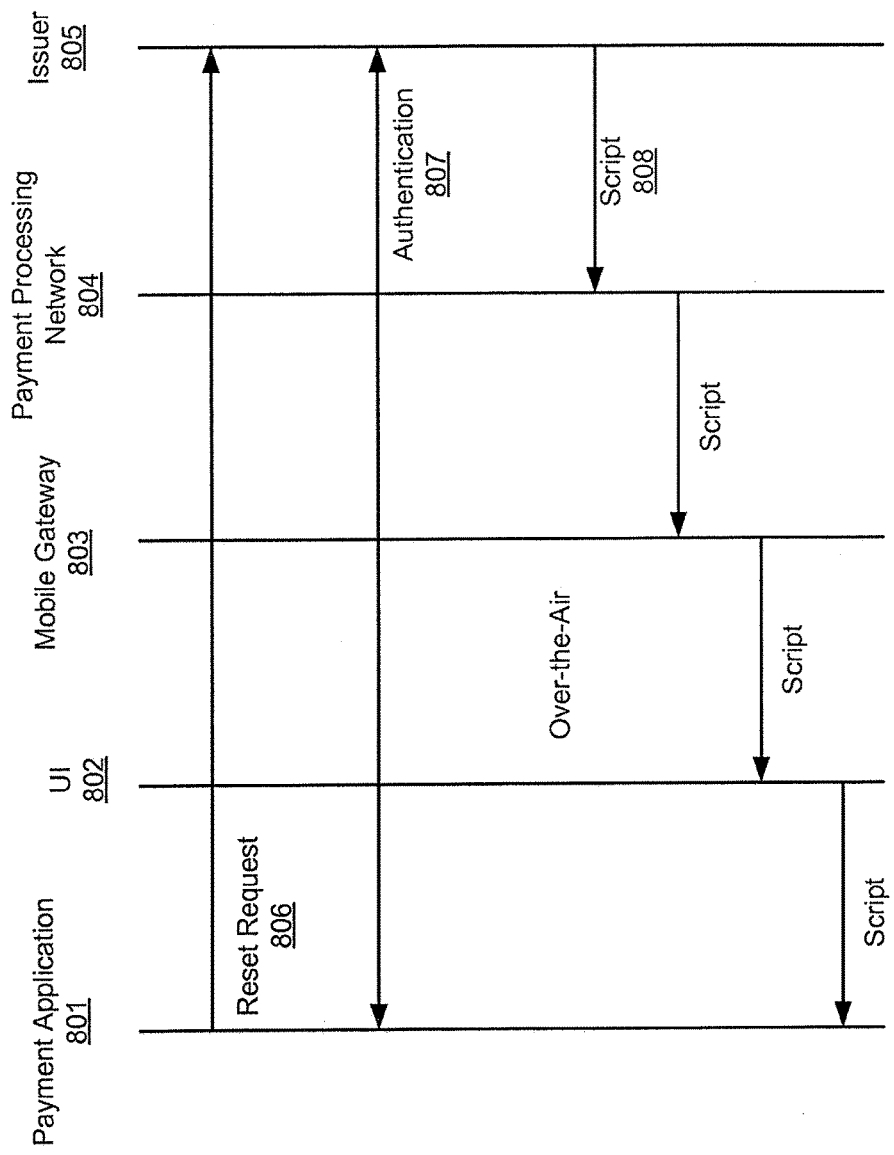
FIG. 8 is a data flow diagram illustrating communication flow for a method for resetting a password associated with a payment application according to an embodiment of the present invention.

FIG. 8 illustrates a data flow diagram for a process to request password reset over-the-air using the mobile device that has the payment application installed on it. Similar to the counter reset embodiment, payment application 810 may send a password reset request 806 to an Issuer 805. Issuer 805 may verify the authenticity of the user by requesting some authentication information. Such authentication information may include user's personal information, account information, etc. Once the user is authenticated, Issuer 805 may determine whether to grant the reset request and in response send an appropriate script 808 to payment application 801 via a payment processing network 804, a mobile gateway 803, and a user interface 802.

Figure 9:
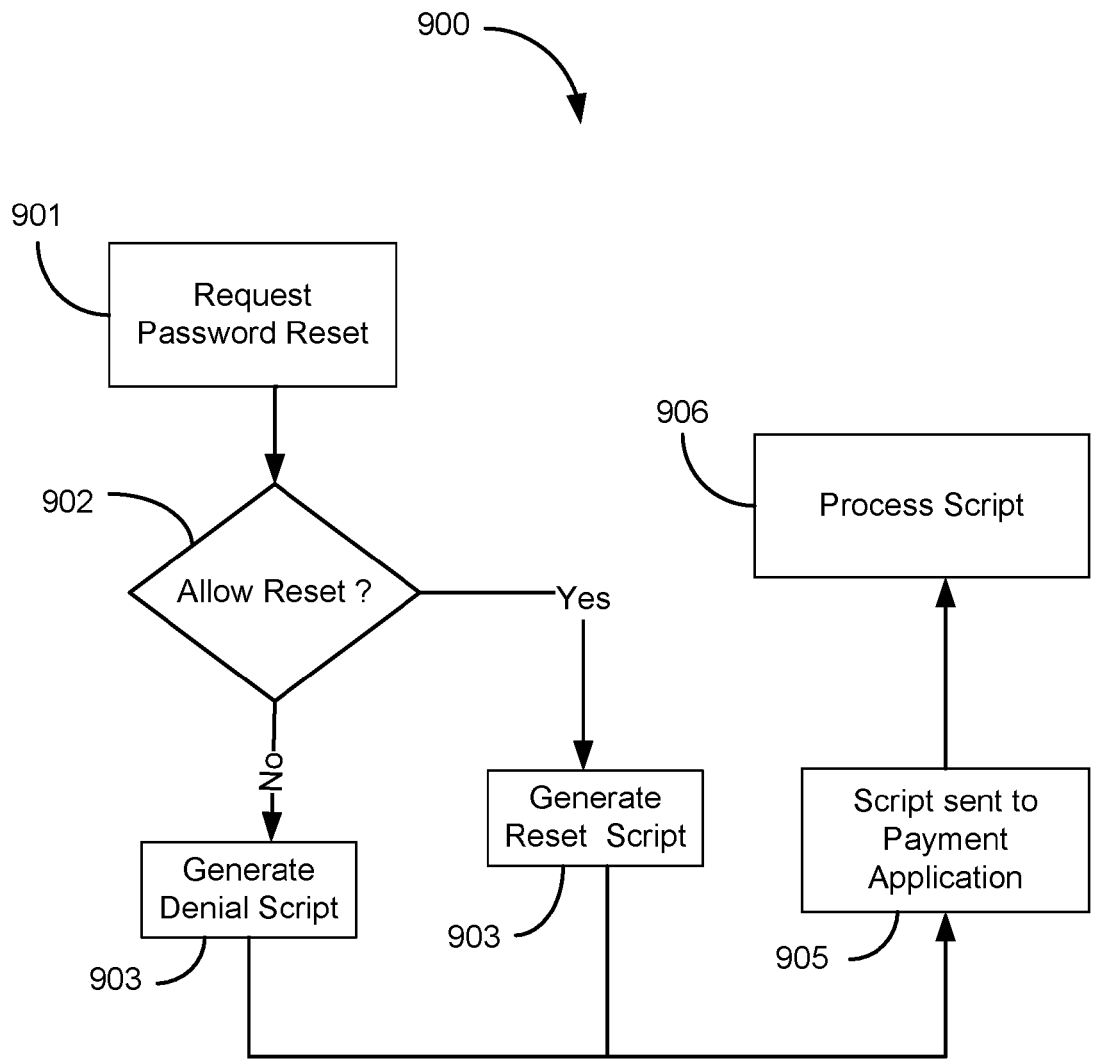
FIG. 9 is a flow diagram for a process of resetting a password associated with a payment application according to an embodiment of the present invention.

FIG. 9 is a flow diagram for a process 900 for resetting a password of a payment application according to an embodiment of the present invention. At stage 901, the user requests password reset via the payment application on his mobile communication device. The password reset request is communicated to the Issuer. As stage 902, the Issuer may verify that user is the registered owner of the payment application and make a determination whether to allow or deny the password reset request. In an embodiment, the authentication process may be performed using out-of-band communication channel. For example, once the user sends a request for password reset through the mobile device, the user may call the Issuer and provide authentication information to the Issuer. In another embodiment, upon receiving the reset request, the Issuer may send a message to the user either on the mobile device or through some other communication channel and provide instructions to the user on establishing his authenticity. Once the user's authenticity is established, the Issuer may proceed to evaluate the password reset request.

In some embodiments, the user may be given some period to establish his authenticity after a password reset request is issued. In an embodiment, if the user does not respond to an authentication request by the Issuer during the period, e.g., 24 hours, the password reset request may be purged from the system and the user may have to resent the request if he needs the password to be reset.

The Issuer may use one or more predetermined criteria e.g., business rules, to make a decision about whether to allow or deny the password reset request. If the Issuer decides to allow the reset request, the Issuer generates a script that can reset the password, at stage 904. As discussed above, the script may be an executable code containing instructions for performing an operation, e.g., a XML script. In such an instance, the UI application associated with the payment application may allow the user to enter a new password. The new password may be designated as the current password and the new password may be needed to access the payment application from that point onwards. If the Issuer decides to deny the request to reset the password, it generates an alternate script at stage 903. The alternate script may include instructions that inform the payment application that the password reset request is denied. In an embodiment, the payment application, through its UI, may inform the user of the denial. The user in that instance may have to personally contact the Issuer to reset the password.

Either the script generated at stage 904 or the script generated at stage 903 is communicated to the payment application on the mobile device at stage 905. Upon receipt of the script, the payment application processes the script and performs the action specified in the script, e.g., reset the password or communicate denial of the request, at stage 906.

As described above, the Issuer can send the response script to a mobile gateway via a payment processing network e.g., VisaNet. The mobile gateway may communicate with the mobile device using an over-the-air communication channel, e.g., cellular network, and forward the response script to the mobile device for use by the payment application. In some embodiments, the Issuer may grant permission to a third party to receive password reset requests on its behalf and issue appropriate scripts. The Issuer may provide a set of predetermined policies to the third party, which the third party may use to evaluate the password reset request. The third party may be a provisioning entity that configures the mobile device with the contactless card and the payment application, an authorized representative of the Issuer tasked with performing the password reset/refresh, or a payment clearance entity that has an existing trusted relationship with the Issuer for payment clearance on the Issuer's behalf.

V. User Authentication

Figure 10:
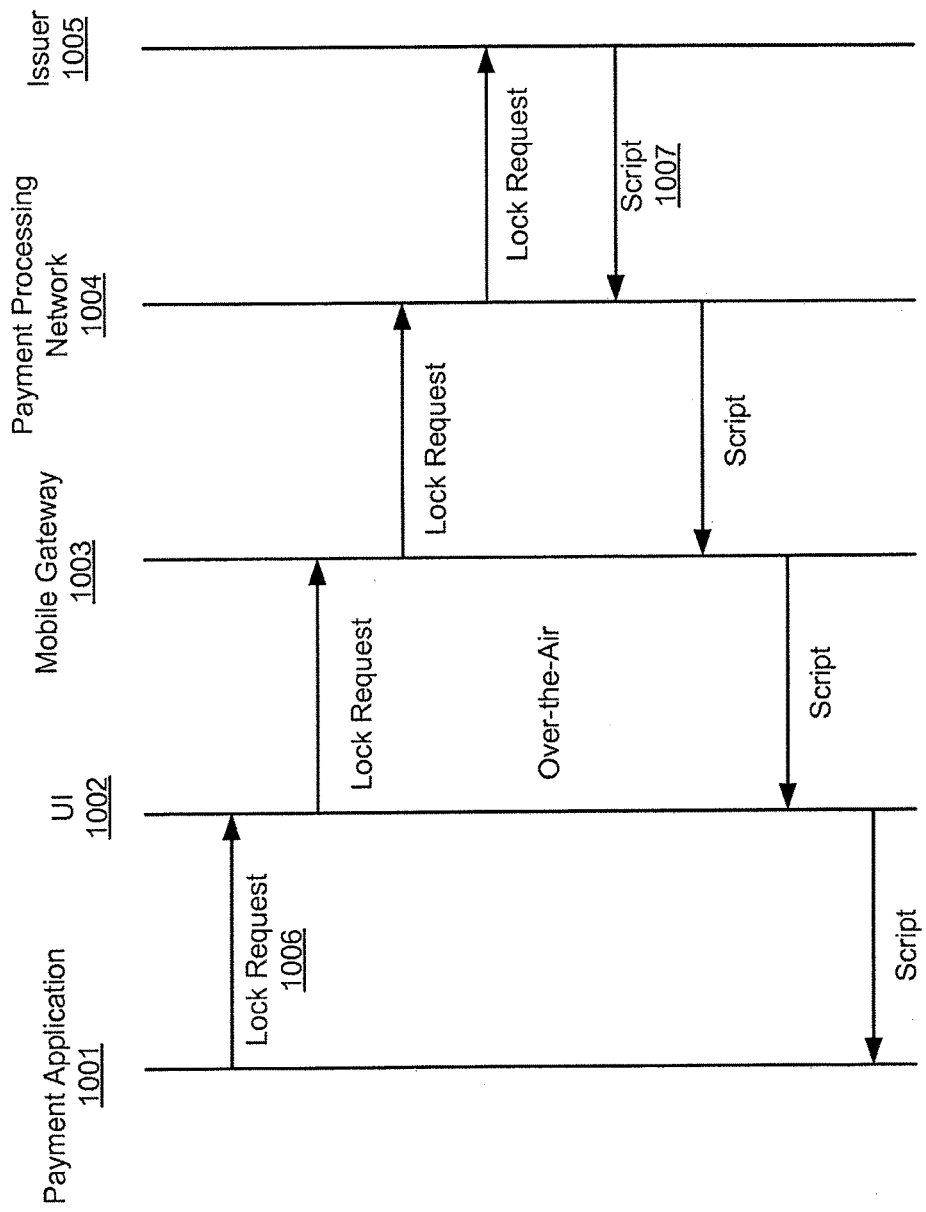
FIG. 10 is a data flow diagram illustrating communication flow for a method for requesting locking of a payment application according to an embodiment of the present invention.
Figure 11:
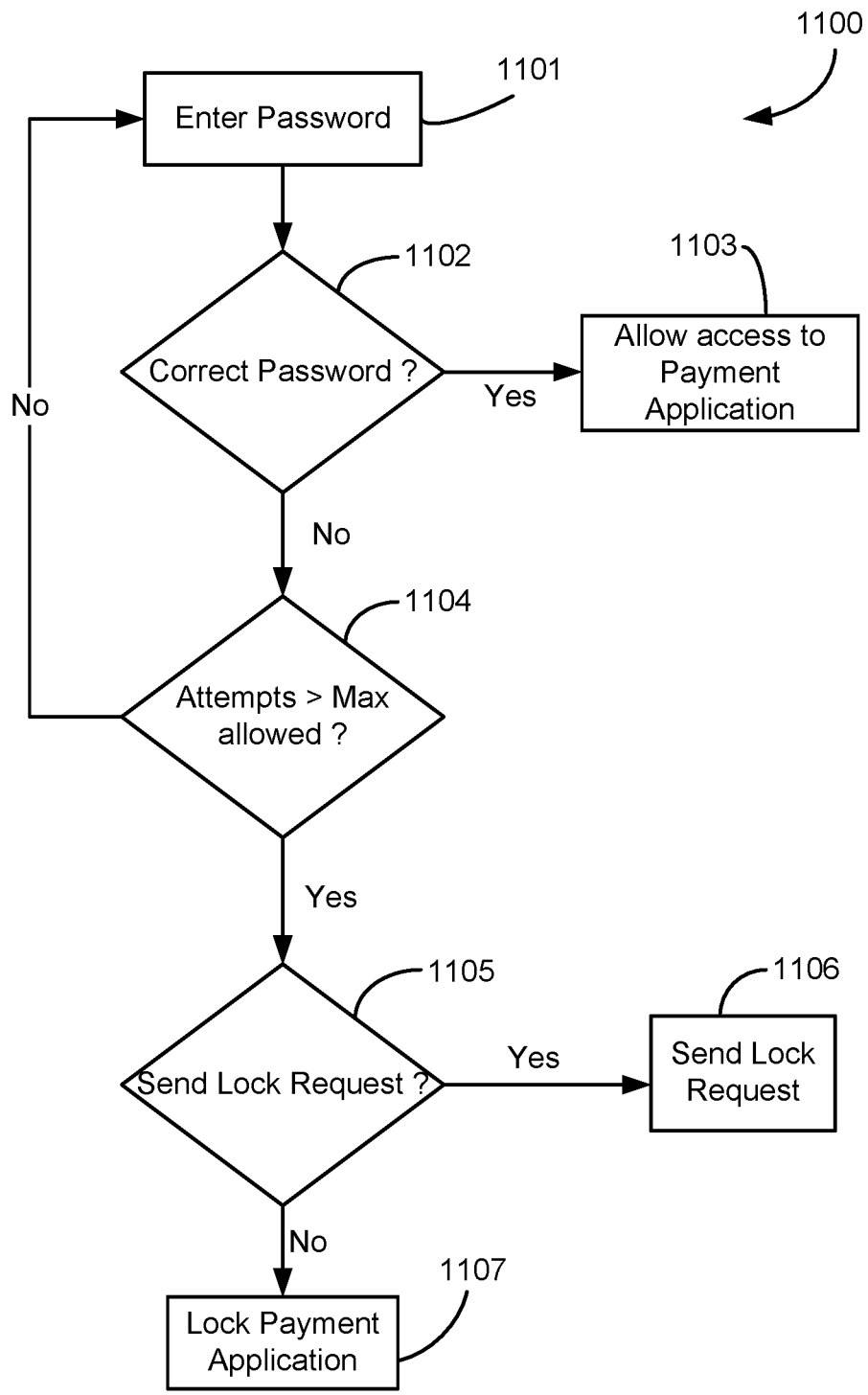
FIG. 11 is a flow diagram for a process of requesting locking of a payment application according to an embodiment of the present invention.

FIG. 10 illustrates a data flow diagram for authenticating a user of the payment application and FIG. 11 is a high-level flow diagram of a process 1100 for authenticating a user of the payment application resident on a mobile device, according to an embodiment of the present invention. When a user uses the mobile device to make a payment transaction, the installed payment application 1001 communicates with a point of sale terminal. Depending on the nature of the transaction, the user may be prompted to enter a password. If the user is required to enter a password, payment application 1001 will pass that request to a user interface (UI) 1002, and UI 1002 will prompt the user for the password at stage 1101. After the user has entered the password, the payment application receives it from UI 1002, and determines whether it is the correct password, at stage 1102. If the password is determined to be correct, the user is allowed access to payment application 1001, at stage 1103. If the password is determined to be incorrect, a determination is made of how many incorrect attempts have been made to enter the password and whether the maximum number of attempts has been exceeded, at stage 1104. In an embodiment, the Issuer may specify the maximum number of attempts allowed to enter the password. If it is determined that the maximum number of attempts has been exceeded, payment application 1101 may determine what action to take at stage 1105. Accordingly, payment application 1001 either locks itself at stage 1107, or it may send a lock application request to the issuer at stage 1106 to lock the payment application. In the instance where the lock application request is sent to the Issuer, the Issuer may send a script, similar to the one described above, to effect locking of the payment application. Once payment application 1001 is locked, it cannot be used for any payment transactions until it is unlocked.

Referring to FIG. 10, depending on its configuration, payment application 1001 may send an application lock request 1006 to UI 1002. UI 1002 passes lock request 1006 to a mobile gateway 1003, via an over-the-air communication. In response, UI 1002 may receive a lock script 1007 from mobile gateway 1003, via over-the-air communication, and pass lock script 1007 to payment application 1001. Payment application 1001 processes lock script 1007, and locks itself.

If payment application 1001 is configured to lock itself after the allowable number of password attempts have been exceeded, no interaction with a payment processing network 1004 is required to lock the payment application. However, if the payment application is configured to send lock request 1006 to an Issuer 1005, in an embodiment, payment application 1001 may send an application lock request 1006 to UI 1002. UI 1002 may pass lock request 1006 to a mobile gateway 1003, via an over-the-air communication. Mobile gateway 1003 may receive the over-the-air lock request 1006 from payment application 1001 (through UI 1002) and send lock request 1006 payment processing network 1004. Payment processing network 1004 may pass lock request 1006 to the issuer 1005. Once Issuer 1005 evaluates the lock request, it may send the appropriate script to payment processing network 1004. Payment processing network 1004 may pass lock script 1007 to mobile gateway 1003 (for transmission to payment application 1001 using an over-the-air communication channel). Payment processing network 1004 may include a server computer as described herein.

In some embodiments, the Issuer may grant permission to a third party to receive password reset requests on its behalf and issue appropriate scripts. The Issuer may provide a set of predetermined policies to the third party, which the third party may use to evaluate the password reset request. The third party may be a provisioning entity that configures the mobile device with the contactless card and the payment application, an authorized representative of the Issuer tasked with performing the password reset/refresh, or a payment clearance entity that has an existing trusted relationship with the Issuer for payment clearance on the Issuer's behalf, e.g., payment processing network 1004.

Once payment application 1001 has been locked, it can only be unlocked by receiving and processing an appropriate unlock script from an authorized source (i.e., issuer 1005, or an agent such as payment processing network 1004 acting on behalf of issuer 1005). Issuer 1005 may require that the password be reset as part of the unlock procedure.

In an embodiment, the Issuer may specify the maximum number of password entry attempts allowed before the payment application can lock itself or send a lock request. However, in certain instances, the user may feel the need for more security for his payment application. In such an instance, the user may specify the maximum number of password entry attempts. However, the user-specified maximum number of password entry attempts can only be less or equal to the Issuer-specified maximum number of password entry attempts. For example, the Issuer-specified number may be 5 attempts but the user may change it to 1 attempt before locking. The allowable number of password attempts may be set as a part of a personalization procedure by the user (i.e., initialization of payment application 1001 with the consumer payment account details and other information), or may be set as a default value.

Figure 12:
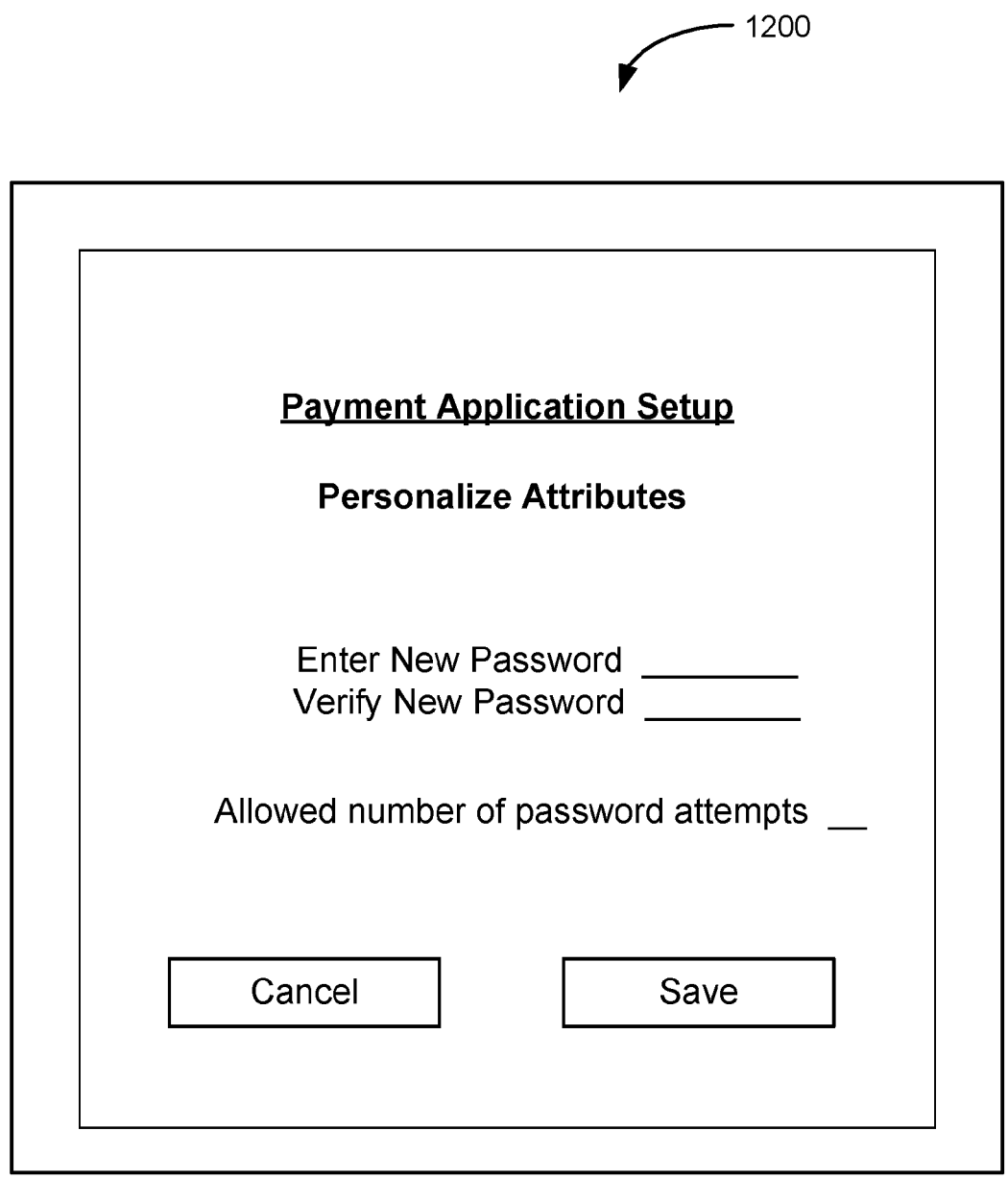
FIG. 12 illustrate a screen shot of a personalization screen according to an embodiment of the present invention.

FIG. 12 is a simplified screen shot of a personalization screen 1200 for initializing payment application 1001. Personalization screen 1200 may be implemented, e.g., using the mobile device and the payment application. The user can set up payment application 1001 to store/change the password and/or store or change the amount of password attempts allowed. Generally, the user can input an amount of password attempts, which are below a default amount, as described above. The personalization screen can be presented to the user by UI 1002 or during a separate initialization on a separate computer system, e.g., by using a personal computer which is securely connected to an online credit/banking application of Issuer 1005. UI 1002 can receive the inputs from the user and pass them to payment application 1001, which can store them for future use.

Note that although the present invention has been described in the context of using the wireless/cellular network to transfer the payment application control data to the mobile device, in some circumstances the near field communications capability may also be used for this purpose. For example, if a mobile device is reported as lost or stolen, when the device is next presented to a device reader or point of sale terminal in an attempt to make a purchase, the mobile device may be recognized as lost or stolen and the payment application disabled by transfer of control data to the device using the device reader or terminal. Further, as mentioned, the application control data may be used to selectively enable or disable features, functions, or operations of the payment application in addition to enabling or disabling operation of the application as a whole.

Further, although the invention has been described in the context of using a data value, an indicator flag, a set of data values, an alphanumeric data string, the presence or absence of data in a specific data location, etc., as the form of the payment application access control data, other suitable forms or methods may also be used to enable or disable the payment application or its functions. Such forms or methods may operate in a different manner than that described with reference to FIGS. 4 and 5, but still remain within the concept of the present invention. For example, enabling or disabling the payment application may occur without the application having to check the value of certain data stored in the secure memory upon activation, such as by preventing the payment application from launching, or disabling a user interface element normally used to launch the payment application. In addition, although certain features or benefits of the present invention have been described with reference to use of the invention with a prepaid account, the present invention may also be used to control use of a payment application for transactions involving a credit, debit, or other form of account.

Thus, as noted above, systems, apparatus, and methods for managing a payment application installed on a mobile device, such as a mobile phone are provided. An Issuer of a payment device can remotely control the payment application by instructing a wireless network carrier or operator to transmit a message to the mobile phone, where the message contains an instruction to perform an operation related to the payment application. The Issuer can remotely reset a counter or a password associated with the payment application, lock or unlock a payment application, and set the access control data to a predetermined value, to prevent unauthorized use of the payment application in the situation in which the mobile phone is lost or stolen, or the Issuer desires to limit access to the payment application for other reasons, such as limiting its exposure to unauthorized uses of the payment device.

Figure 13:
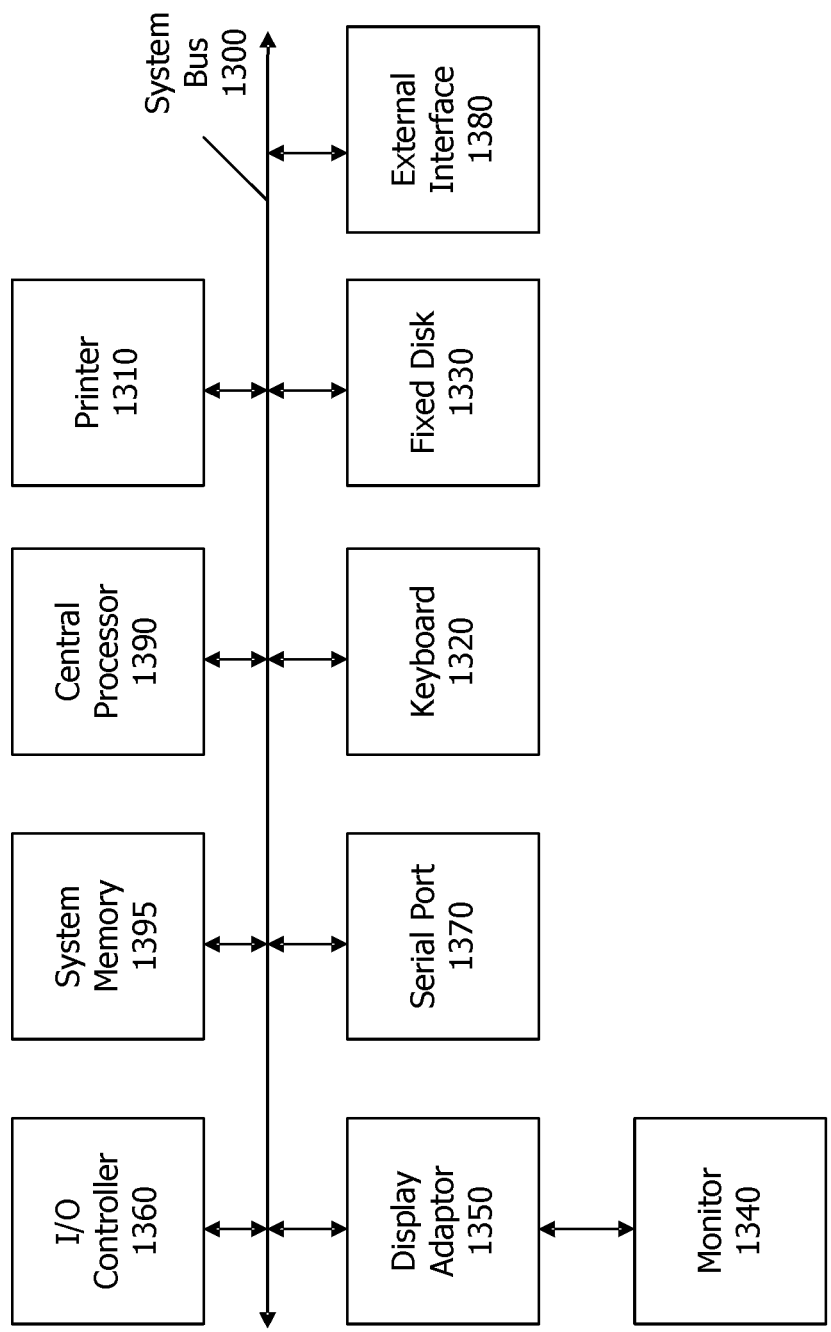
FIG. 13 is a block diagram of an exemplary computing apparatus that may be used to implement any embodiment of the present invention.

FIG. 13 is a block diagram of an exemplary computing apparatus that may be used to implement any of the embodiments of the present invention. The elements of the computing apparatus illustrated in FIG. 13 may be used to implement the inventive processes, methods, or operations in whole or in part, and may be part of a server or other computing apparatus (e.g., a mobile gateway, an Issuer managed server, etc.). The subsystems shown in FIG. 13 are interconnected via a system bus 1300. Additional subsystems such as a printer 1310, keyboard 1320, fixed disk 1330 (or other memory comprising computer readable media), monitor 1340, which is coupled to display adapter 1350, and others are shown. Peripherals and input/output (I/O) devices, which couple to I/O controller 1360, can be connected to the computer system by any number of means known in the art, such as serial port 1370. For example, serial port 1370 or external interface 1380 can be used to connect the computer apparatus to a wide area network such as the Internet, a mouse input device, or a scanner. The interconnection via system bus allows the central processor 1390 to communicate with each subsystem and to control the execution of instructions from system memory 1395 or the fixed disk 1330, as well as the exchange of information between subsystems. The system memory 1395 and/or the fixed disk 1330 may embody a computer readable medium.

It should also be noted that embodiments of the invention can be combined in any suitable manner and in any suitable combination without departing from the scope of the invention. For example, although discrete concepts including password re-setting, counter re-setting, etc., are discussed in detail above, it is understood that embodiments of the invention may include such concepts alone, or in combination with other concepts on a mobile payment device, on backend server, and/or as part of a system.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A computer-implemented method of controlling use of a payment application installed on a mobile device comprising a processor and a contactless element coupled to the processor, the method comprising:

receiving, by a server computer, a request to enable or disable user access to features or functions of the payment application;

generating, by the server computer, a command message responsive to the request, the command message comprising control data that when executed by the processor, permits or denies access to the features or functions of the payment application, so that the mobile device including the payment application can only be used to conduct only certain types or amounts of purchases; and transmitting, by the server computer, the generated command message to the mobile device over a wireless network, wherein the processor executes the control data causing the payment application in the mobile device to permit or deny access to the features or functions of the payment application, so that the mobile device including the payment application can only be used to conduct only certain types or amounts of purchases at a terminal comprising a contactless reader in short range communication with the mobile device, wherein the control data includes one or more of an access control indicator, an alphanumeric data string, or a set of data values; and wherein the mobile device is configured to extract the control data from the command message and store the control data in a secure data storage of the mobile device.

2. The computer-implemented method of claim 1, wherein the request is received from a payment authorizing entity of the payment application.

3. The computer-implemented method of claim 1, wherein control data is used by the mobile device to enable payment transactions for one or more of a prepaid account, a credit account, or a debit account.

4. A server computer, comprising:

a memory that stores one or more computer-executable instructions; and a first processor configured to access the memory and execute the computer-executable instructions to implement a method comprising:

receiving a request to enable or disable user access to features or functions of a payment application on a mobile device comprising a second processor and a contactless element coupled to the second processor;

generating a command message responsive to the request, the command message comprising control data that when executed by the second processor, permits or denies access to the features or functions of the payment application, so that the mobile device including the payment application can only be used to conduct only certain types or amounts of purchases; and transmitting the generated command message to the mobile device over a wireless network, wherein the second processor executes the control data causing the payment application in the mobile device to permit or deny access to the features or functions of the payment application, so that the mobile device including the payment application can only be used to conduct only certain types or amounts of purchases at a terminal comprising a contactless reader in short range communication with the mobile device, wherein the control data includes one or more of an access control indicator, an alphanumeric data string, or a set of data values; and wherein the mobile device is configured to extract the control data from the command message and store the control data in a secure data storage of the mobile device.

5. The server computer of claim 4, wherein the request is received from a payment authorizing entity of the payment application.

6. The server computer of claim 4, wherein control data is used by the mobile device to enable payment transactions for one or more of a prepaid account, a credit account, or a debit account.

7. A non-transitory computer-readable storage medium comprising one or more computer-executable instructions to implement a method, the method comprising:

receiving a request to enable or disable user access to features or functions of a payment application on a mobile device comprising a processor and a contactless element coupled to the processor;

generating a command message responsive to the request, the command message comprising control data that when executed by the processor, permits or denies access to the features or functions of the payment application, so that the mobile device including the payment application can only be used to conduct only certain types or amounts of purchases; and transmitting the generated command message to the mobile device over a wireless network, wherein the processor executes the control data causing the payment application in the mobile device to permit or deny access to the features or functions of the payment application, so that the mobile device including the payment application can only be used to conduct only certain types or amounts of purchases at a terminal comprising a contactless reader in short range communication with the mobile device, wherein the control data includes one or more of an access control indicator, an alphanumeric data string, or a set of data values; and wherein the mobile device is configured to extract the control data from the command message and store the control data in a secure data storage of the mobile device.

8. The non-transitory computer-readable storage medium of claim 7, wherein the request is received from a payment authorizing entity of the payment application.

9. The method of claim 1, the secure data storage is a secure memory.

10. The method of claim 1, wherein only certain types of transactions can be conducted with the mobile device after the control data is executed.

11. The method of claim 1, wherein the mobile device authenticates a user of the mobile device before allowing the mobile device to conduct a transaction with the terminal.

12. The method of claim 1, wherein the short range communication comprises NFC.

13. The method of claim 1, wherein the mobile device is a mobile phone and the terminal is a payment terminal at a merchant.

* * * * *